United States Patent [19]
Funakoshi et al.

[11] Patent Number: 5,558,763
[45] Date of Patent: Sep. 24, 1996

[54] SEWAGE TREATMENT SYSTEM WITH AIR JETTING MEANS

[75] Inventors: Yasushi Funakoshi, c/o Bureau of Sewerage, Tokyo Metropolitan Government 8-1, Nishi-Shinjuku 2-chome, Shinjuku-ku, Tokyo; Khoji Ogata, Nishi-Shinjuku; Masayuki Kojima, Chiyoda-ku; Hitoshi Kawaziri, Chiyoda-ku; Hirofumi Yamamoto, Chiyoda-ku; Kazuhiko Noto, Chiyoda-ku; Naomichi Mori, Chiyoda-ku, all of Japan

[73] Assignees: Hitachi Plant Engineering & Construction Co., Ltd.; Yasushi Funakoshi, both of Tokyo, Japan

[21] Appl. No.: 263,200

[22] Filed: Jun. 21, 1994

[30] Foreign Application Priority Data

Jun. 24, 1993 [JP] Japan .................. 5-153590
Apr. 21, 1994 [JP] Japan .................. 6-083472
Apr. 21, 1994 [JP] Japan .................. 6-083473

[51] Int. Cl.$^6$ ............................ B01D 35/05
[52] U.S. Cl. .................. 210/150; 210/151; 210/219; 210/220; 210/299
[58] Field of Search .................. 210/274, 286, 210/295, 299, 320, 792–796, 210–260, 408, 150, 151, 219, 220, 269, 456, 523, 617

[56] References Cited

U.S. PATENT DOCUMENTS 5,387,335  2/1995  Iwai et al. .................. 210/151

FOREIGN PATENT DOCUMENTS 2049072   4/1971  Germany .................. 210/150
51-85257  7/1976  Japan .
60-193508 10/1985 Japan .
2-12405   1/1990  Japan .

Primary Examiner—Joseph W. Drodge
Attorney, Agent, or Firm—Oliff & Berridge

[57] ABSTRACT

A sewage treatment system is provided, for cleaning a sewage by filtering solid components in the swage through floating filter medium, wherein the filtration performance can be improved and the filtration cleaning can be performed efficiently. The sewage 18 is flowed into the treatment tank 12 in upward-flow, and filtered through the floating filter media layer 22 made of the meshy cylindrical floating filter medium 20 which have smaller specific gravity than the sewage 18. To wash floating filter medium 20, the air is jetted from the air jetting pipe 54 and the revolution flow is generated to scale solid components adhering to filter medium, and then the sewage 18, which has washed the floating filter medium 20, are discharged to the outside of the tank 12 while the air is jetted from the air jetting pipe 56 for full jetting to jet the floating filter media layer 22 in whole.

10 Claims, 20 Drawing Sheets

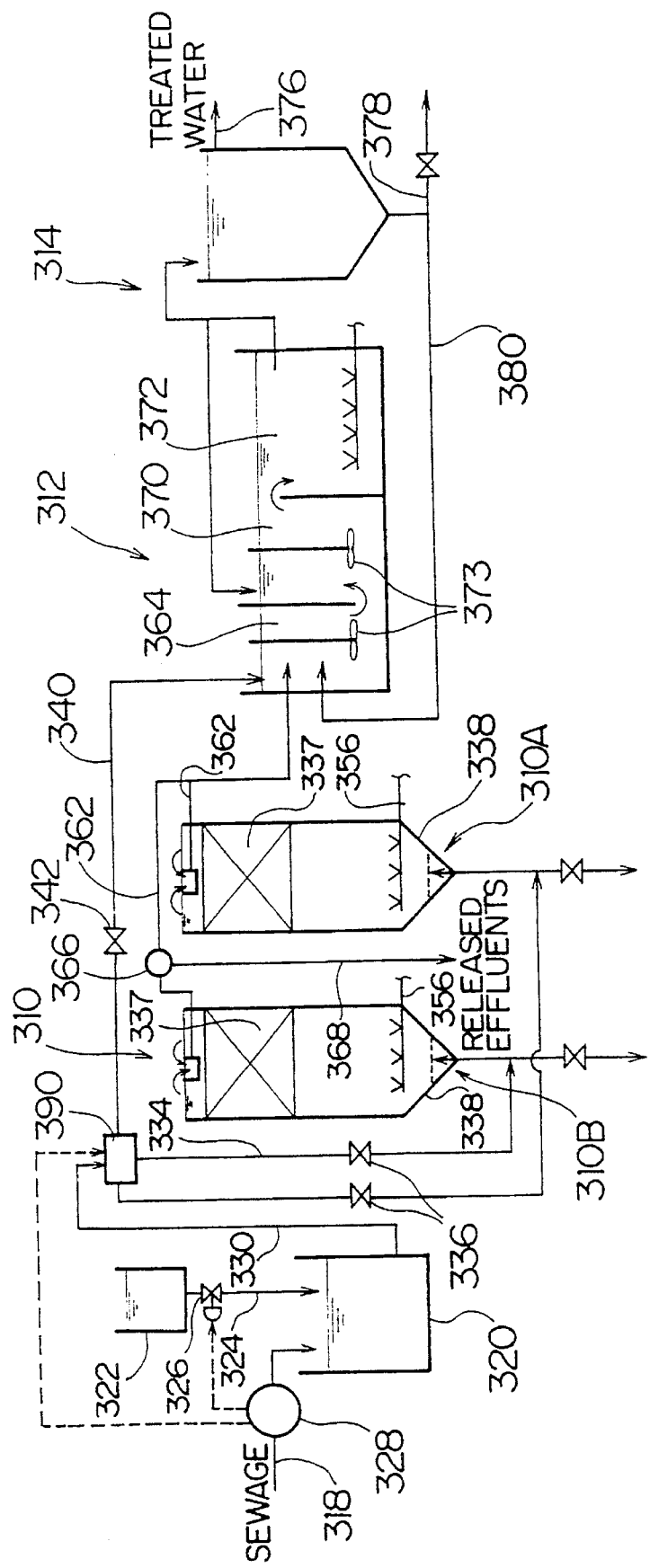

SEWAGE TREATMENT SYSTEM WITH AIR JETTING MEANS

BACKGROUND OF INVENTION

1. Field of Invention

The invention relates to a sewage treatment system and, more particularly to a sewage treatment system characterized by removal of solid components in sewage by high-rate filtration of floating filters media, cleaning of filter adhered with solid components, and biological treatment of sewage after having removed the solid components.

2. Description of the Related Art

Generally, the conventional sewage treatment process, which cleanses the sewage and releases the proceeds into public waters such as river and lake, consists of two parts; The first process of natural sedimentation of solid components in the sewage in the primary sedimentation tank, and the second process of biological treatment by microbes in the activated sludge treatment system. The activated sludge in the sewage which have been treated biologically is sediment in the final sedimentation tank, and the supernatant liquid of the sewage is released and a part of the activated sludge is taken out as surplus sludge, and then the remaining part of the activated sludge is sent to the activated sludge treatment system. After the sewage has been treated to conform to the water quality standards for public waters, the water quality is then improved.

However, recently, as urbanization has advanced and the living standards have risen, the concentration of water contamination, and the increased inflow of sewage, and the various sources of sewage have increased.

In the conventional sewage treatment system comprising the primary sedimentation tank and the activated sludge treatment system, the conventional sewage treatment system cannot meet the treatment needs since the solid component removal capacity by natural sedimentation in the primary sedimentation tank is limited. Therefore, a filtration system using a high-rate filtration process has been developed to remove solid components quickly. According to the filtration system, a layer of floating filter media, which is made of granular filter media of which specific gravity is smaller than the sewage, is provided and the sewage is filtered through the floating filter media layer. When the filtering performance declines by sticking solid components in the sewage to the filter medium, the filter medium are cleaned to reactivate the filtering capability. Therefore, the filtration rate is higher than that of the primary sedimentation tank. For example, patents on the filtration systems are disclosed in Japanese Patent Application Laid-open No. 51-85257, Japanese Patent Application Laid-open No. 60-193508, and Japanese Utility Model Application Laid-open No.2-12405.

The conventional filtration system using a high-rate filtration process has a higher filtration rate than the primary sedimentation tank, therefore, only small area is required for the treatment system. However, the filter medium can be blocked easily and break through pint is shortened, at which the filtrating performance of the filter medium gets lost, is short and, therefore, there is a disadvantage in that the filter medium must be cleaned frequently. Further, there is another disadvantage in that large effluent of filter backwash water is generated. And, there is a further disadvantage in that the insufficient filtration rate cannot be achieved when the flow resistance is strong.

In the sewage treatment system the junction-type sewage treatment area, when extraordinary amount of rain water exceeding the activated sludge treatment capacity due to stormy weather flow into the excess sewage must be released to public waters merely after removing the solid component, therefore, the solid components in the sewage must be removed as much as possible at the time of release. However, in the conventional sewage treatment system the sewage is released into public waters without sufficient solid component removal due to limited treatment capacity for excess inflow at a stretch, and absence of adequate treatment technology for sudden increase of inflow, therefore, there is a problem in that the quality of public waters deteriorates.

Under these circumstances, the following capabilities have been desired to the sewage treatment system:

(1) A sewage treatment system must be developed, wherein efficient filtration of solid components in sewage, efficient cleaning of filter medium for recycling, and the system can become compact.

(2) A sewage treatment system in which high-rate filtration and biological treatment are incorporated, and sewage treatment technology which can meet the amount of the inflow sewage to the sewage treatment system and the condition thereof.

SUMMARY OF THE INVENTION

This invention has been developed to eliminate these disadvantages and aims to provide a sewage treatment system, wherein solid components in sewage can be filtered efficiently, and the filter medium can be cleaned efficiently to recycle the filter medium, further, the system can become compact.

Moreover, this invention has been developed to eliminate these disadvantages and aims to provide a sewage treatment system, wherein a filtering system of the high-rate filtration process and a biological treatment system are combined, and the water quality of the treated water can be improved in accordance with the inflow volume and the nature of the sewage.

To achieve the above objects, a sewage treatment system for filtering solid components in sewage and cleansing the sewage, the sewage treatment system comprising: a floating filter media layer, which is provided in a treatment tank for filtering the solid components in the sewage which flows upward in the treatment tank by a layer which is formed with numerous floating filter medium which have smaller specific gravity than the sewage; and, an jetting means provided at the lower position of the floating filters media layer, for washing the floating filters medium by generating a circular flow to the sewage in the treatment tank, and for discharging the sewage which have washed the floating filter medium by Jet-ting air to the floating filter media layer as a whole.

To achieve the above objects, a sewage treatment system for filtering solid components in sewage, and cleansing the sewage, the sewage treatment system comprising: a filtration chamber, in which a floating filter media layer composed of numerous filters which have smaller specific gravity than the sewage for filtering upward flow of inflow sewage, and an air jetting means fixed at the lower position of the floating filter media layer for generating a circular flow to the sewage in the treatment tank to wash the floating filter medium, and for jetting air to the floating filter media layer to discharge the sewage which have washed filter medium; a sedimentation chamber located under the filtration chamber through a partitive plate for storing the sewage which have washed and the floating filter medium and which have been jetted from the filtration chamber and for discharging the sewage which are separated into sludge and supernatant liquid after the sedimentation of the solid components in the sewage; and, a partitive plate for separating the filtration chamber and the sedimentation chamber.

To achieve the above objects, a sewage treatment system for applying filtration treatment and biological treatment to sewage, and cleansing the sewage, the sewage treatment system comprising: a filtration device for filtering the sewage, which is flowed into the filtration tank in a upward-flow, with floating filter media layer formed with numerous floating filter medium which have smaller specific gravity than the sewage; a biological treatment device for biologically treating by comming in contract with filtered water which is filtered through the filtration device to microbes; a bypass line for sewage flowing directly into an entrance of the biological treatment plant by bypassing the filtration plant; and, a releasing line for directly releasing the filtered water, which is filtered by the filtration plant, to public waters without passing through the biological treatment device.

According to the first invention, the sewage, which flows into the treatment tank in the upward-flow, is filtered by the floating filter media layer formed with the floating filter medium. When the filtering performance declines because solid components adhere to the filter medium, air is Jetted from the air jetting means, which is located under the floating filter media layer, to generate a circular flow in the sewage. The floating filter medium are circulared with the circular flow, therefore, the solid components adhering on the floating filter medium can be scaled effectively by the friction of the filter medium and the shearing power of air and the like. Then, the sewage, which has been washed by the floating filter medium, is discharged to the outside of the tank, while air is jetted from the air jetting means to the floating filter layer in whole. With this arrangement, the solid components, which have been scraped once in to the sewage, can be discharged without re-adhering to the filter medium. And, the floating filter media is formed in a manner that the upper and lower ends are opened and the side is meshy, and is a meshy cylinder of which void ratio is more than 80%, therefore, the sewage can run through it easily and the maximum filtration speed can be increased to 1000 m/day, and further, the removal rate of the solid components can be improved and the filtration performance can be maintained. Further, when the projections are formed on the inside of the floating filter media, filtration performance can be improved moreover. The diameter of the wire which forms the mesh of the floating filter media is from 1 to 5 mm, more desirably from 2 to 4 mm.

According to the second invention, as well as the first invention, the sewage, which is flows into the filtration chamber in the upward-flow, is filtered by the floating filter media layer formed with the floating filtration medium, and the floating filtration medium are cleaned by jetting air from the air jetting mens when the filtration performance of the floating filtration medium declines. And, in the second invention, particularly, a sedimentation chamber is provided under a filtration chamber, and the sedimentation chamber each and the filtration chamber are separated by a partitive plate. With this arrangement, the filtering and cleaning process of filter medium in the filtration chamber, and the storage of the sewage, which is discharged from the filtration chamber and have washed the filter medium, and the sedimentation and removal process of solid components in the sewage can be performed simultaneously. Therefore, the filtering process can be performed continuously except the filter media cleaning process. Therefore, the filtering efficiency can be improved and the system can become compact. And, the filter cleaning water is separated into supernatant liquid and sludge in the sedimentation chamber, therefore, clean filtered water can be dumped easily and the sludge volume can be decreased.

According to the third invention, the filtering system and the biological treatment system are coordinated systematically so that solid components in the sewage can be removed at a high filtration rate, therefore, the load in the biological treatment system can be reduced, and the filtering performance can be improved. Particularly, in the filtering system, the floating filter media layer forms the filter medium, which are used in the first invention, so that the filtering performance can be remarkably improved. And, the sewage can be sent directly to the biological treatment system through the bypass line, therefore, sufficient organic concentration for biological treatment can be kept and the sewage with little solid components can be delivered directly to the biological treatment process. And, a part of the filtered water, which is filtered with the filtering system can be discharged to public waters through a releasing line without passing the biological treatment system, therefore, it can easily cope with the volume and the nature of the inflow sewage. Particularly, in the sewage treatment area of the Junction type, the temporary increase of the water which is caused by rain can be coped with.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION OF THE DEFERRED EMBODIMENT

Detailed description will hereunder be given of the preferred embodiment of a sewage treatment system according to the present invention with reference to the accompanying drawings.

Figure 1:
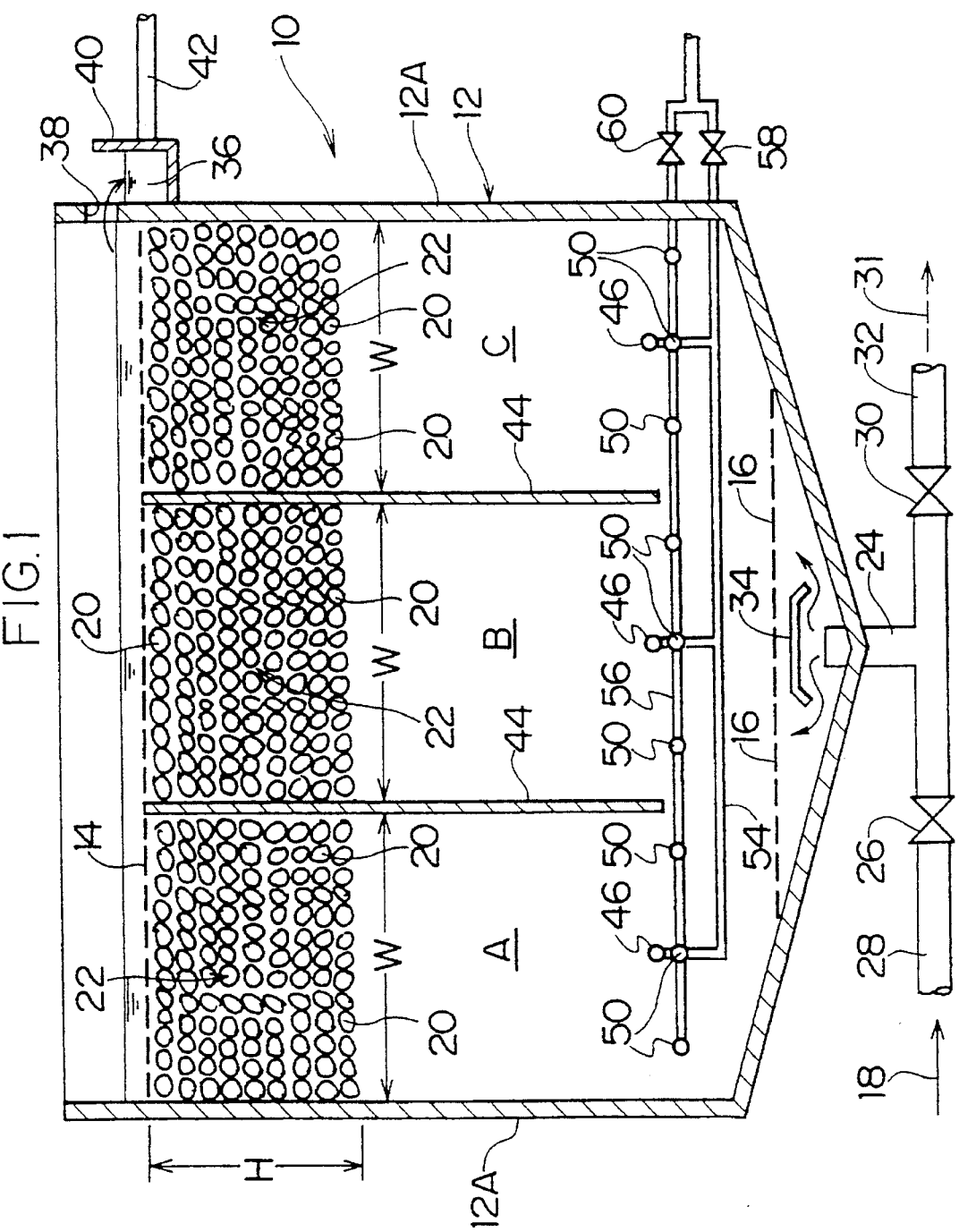
FIG. 1 is a longitudinal sectional view that explains the first embodiment of the sewage treatment system according to this invention.
Figure 2:
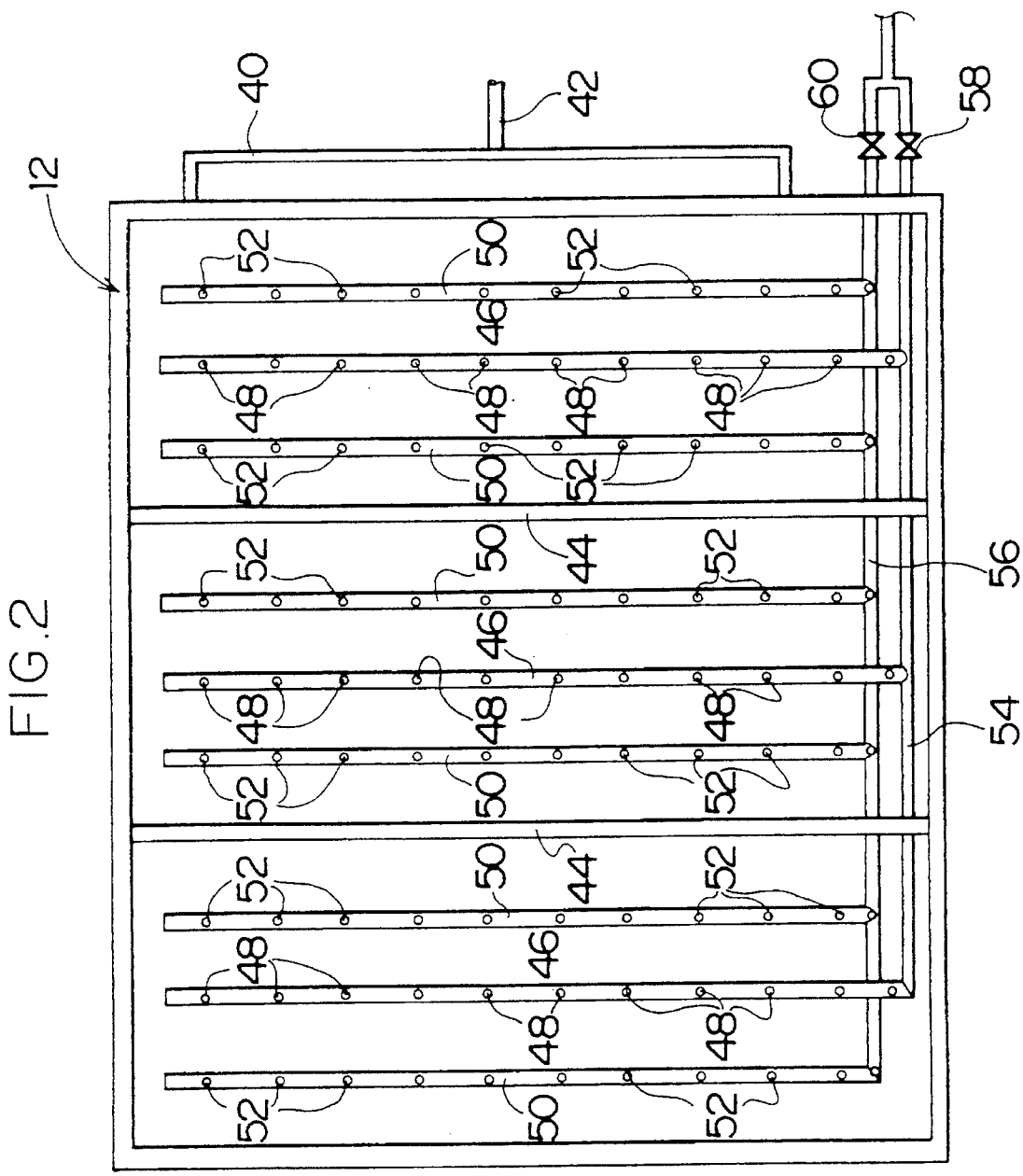
FIG. 2 is a plan view shown from the top of FIG. 1.
Figure 3:
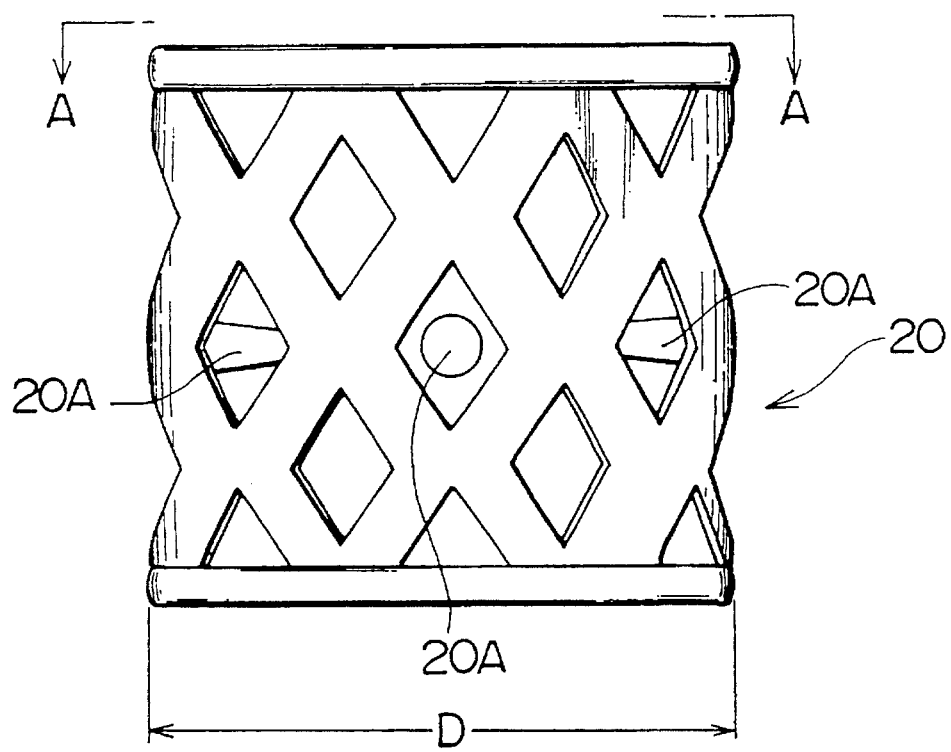
FIG. 3 is a side view showing a form of a floating filter media used in the sewage treatment system according this invention.

FIG. 1 is the longitudinal section view for explaining the first embodiment of a sewage treatment system according to this invention. FIG. 2 is the plan view shown from the top of FIG. 1 without the floating filter media layer 22.

Figure 4:
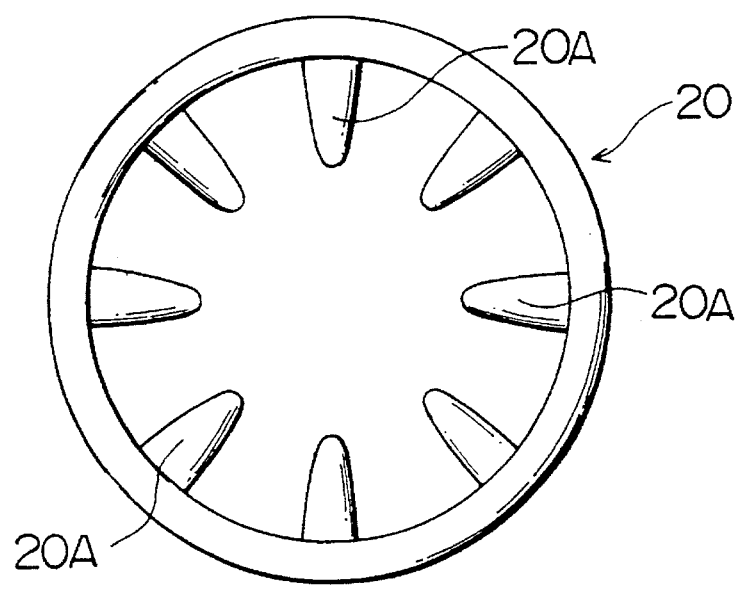
FIG. 4 is a view shown from the direction of the line A—A in FIG. 3.
Figure 5:
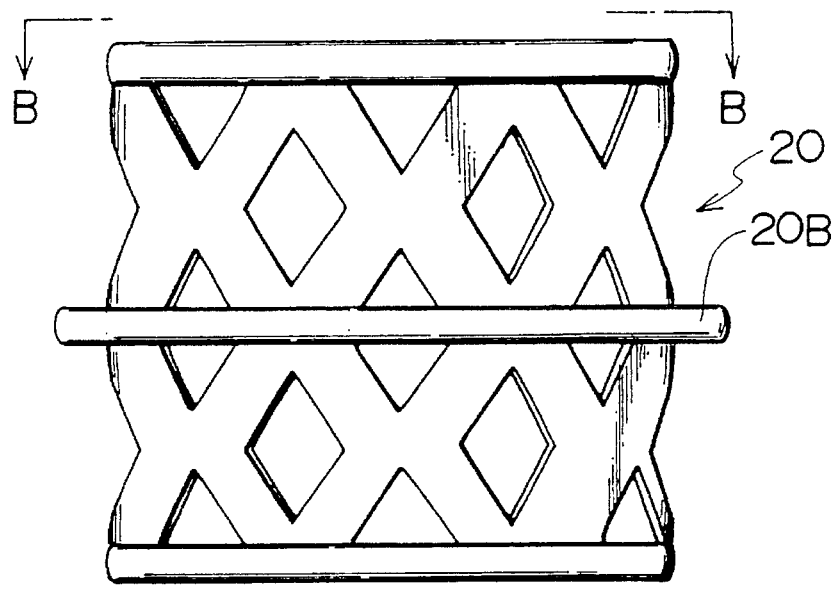
FIG. 5 is a side view showing another form of a floating filter media.
Figure 6:
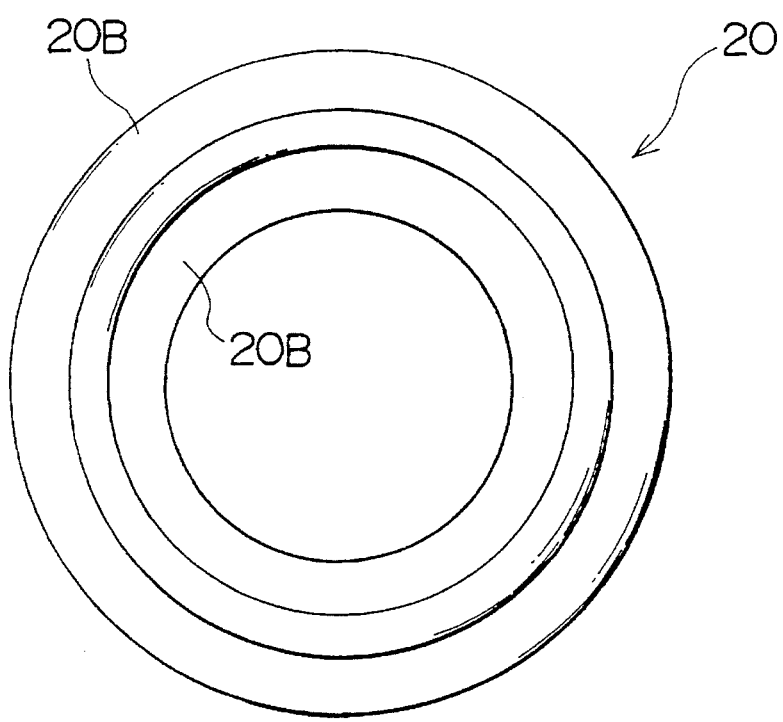
FIG. 6 is a view shown from the direction of the line B—B in FIG. 5.
Figure 8:
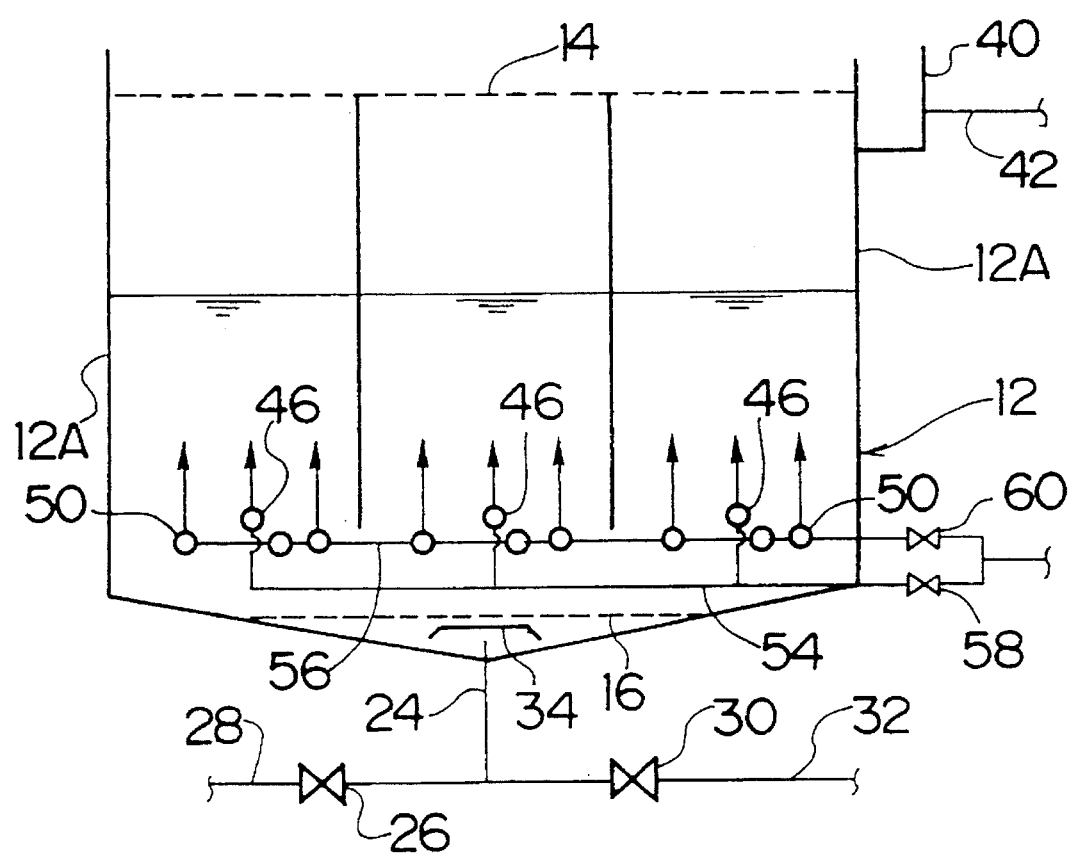
FIG. 8 is an explanatory view explaining a state that air is jetted to filter medium in whole and washing water is discharged out of the tank while washing the filter medium in the first embodiment.

As shown in FIGS. 1 and 2, the upper part of a treatment tank 12 is formed in a square and the bottom thereof in a square cone. An upper screen 14 and a lower screen 16, which are formed in meshy, are located across the upper and lower parts of the treatment tank 12. Numerous filter medium 20, which have constructions described later, are floated in the sewage 18 and fixed to form a floating filter media layer 22 under the upper screen 14. The preferred height of the floating filter media layer 22 is about 2 m±50 cm, and the preferred ratio of the layer height of the floating filter media layer 22 to the height of the treatment tank 12 is 0.5 or less. And, as shown in FIGS. 8 and 5, the filter medium 20, which forms the floating filter media layer 22, is formed in a meshy cylinder, of which the upper and lower edges are opened and the side is meshed, and which has the projections 20A and 20B and is lighter than the sewage. In a detailed description, the filter medium 20 is made of polypropylene which has anti-corrosive properties and the average diameter (D) thereof is about 20 mm. The mesh is made of propylene wires of which the thickness is from 1 to 5 mm, preferably from 2 to 4 mm. The apparent specific gravity of the filter medium 20 is about 0.9, the void ratio about 90%, and the surface ratio about $300^2$ /filter media $m^3$. The floating filter media layer 22 is provided with the filter medium 20, which is formed In this way, whereby an almost full layer can be filtered and the minimum filter resistance can be kept. Thus, the high-speed filtration treatment can be performed at the maximum filtration speed 1,000 m/day, and the filtration duration can be lengthened. The projections 20A and 20B are formed in an acerate shape (see FIG. 4) or a sword guard shape (see FIG. 6) in accordance with the shapes of the solid components in the sewage 18.

An opening of the pipe 24 are made at the bottom of the treatment tank 12, and the pipe 24 is placed from the bottom of the treatment tank 12 to the outside thereof and divided into two branches. One branch, which is divided into two, is connected with a raw water pipe 28 via a raw water valve 26, and the other branch is connected with a discharge pipe 32 which discharges the washing waste water 31 containing risen solid component concentration caused by washing floating filter medium 20, via a discharge valve 30. And, a dispersion plate 34, which disperses the sewage 18 which flows into the treatment tank 12 to the treatment tank 12 as a whole, is placed over the opening of the pipe 24. Thus, the sewage 18, which has already flown into the bottom of the treatment tank 12 through the raw water pipe 28 and the pipe 24, is dispersed by the dispersion plate 34, and flown up in the treatment tank 12 as upward-flow. At the upper part of the treatment tank 12, an overflow exit 38 of the filtered water 36, which is filtered and cleansed by the floating filter media layer 22, is formed, and the filtered water 36 which has overflown from the overflow exit 38 flows into a trough 40, and is sent into the next treatment process and the like via the treatment pipe 42.

In the treatment tank 12, a partition 44 is vertically placed about from the upper screen 14 to the lower screen 16 in a manner that the width(W)/height(H) ratio of the floating filter media layer 22 is between 0.3 and 1.6. Areas A, B, and C separated by partition 44 are communicated at the upper and lower ends of the partition 44. Under the floating filter media layer 22 and at almost the centers of the respective areas A, B, and C, air pipes 46, 46, 46 for circular flows are installed in parallel with the partition 44, and numerous air jet nozzles 48, 48 . . . (refer to FIG. 2) are opened on the air pipe 46 for circular flows. Air pipes 50, 50, 50 for jetting air in whole are installed in parallel with the air pipe 46 for circular flows, and numerous air jet nozzles 52, 52 . . . (refer to FIG. 2) are opened on the air pipe 50 for jetting as a whole. The air pipe 46 for circular flows and the air pipe 50 for jetting air in whole are connected to a compressor, not shown, through the respective air supply pipes 54 and 56, and an air valve 58 for circular flows and an air valve 60 for full jetting are provided in the respective air supply pipe 54, 56 to be switched respectively.

Next, a description will be given of the operation of the sewage treatment system 10 according to this invention.

First, the filtration process are described, the raw water valve 26 is opened while the discharge valve 30 is closed. The sewage 18, which flows into the bottom of the treatment tank 12 through the raw water pipe 28 and the pipe 24, is dispersed by the dispersion plate 34, and then, large impunity are removed by the lower screen 16, and the sewage flows up as an upward-flow in the whole treatment tank 12. The sewage 18 which flows up in the treatment tank 12, is filtered by the floating filter media layer 22, and then, passes through the upper screen 14 and overflows from the overflow exit 38 to the trough 40 as filtered water 86. The solid components in the sewage 18 are captured by the filter medium 20 while passing through the floating filter media layer 22, whereby the solid components are removed.

Figure 7:
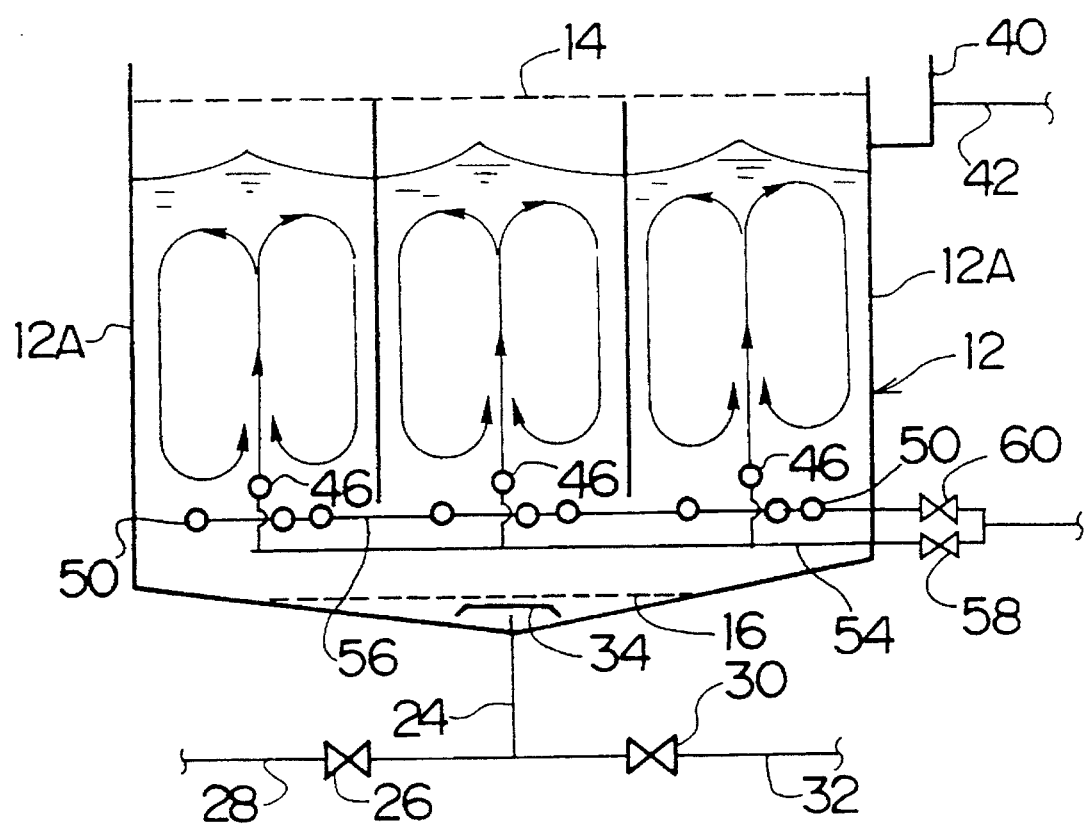
FIG. 7 is an explanatory view explaining a state that filter medium are circulated by air while washing the filter medium in the first embodiment.

Next, a description will be given of the filer media washing process when the filtering capacity of the filter medium 20 decreases which is caused by increasing solid components in sewage 18 adhering to the filter medium 20 during the filtration. First, the raw water valve 26 is closed to stop the flow of the sewage 18 into the treatment tank 12. Next, the discharge valve 30 is opened to lower the water level of the treatment tank 12 below the upper screen 14. When the water level of the treatment tank is lowered, the discharge valve 80 is closed. The reason that the water level in the treatment tank 12 is lowered is to prevent solid components, which were scaled off from the filter medium 20 when they were washed, from overflowing with the the filtered water 36 into the trough 40. Then, the air valve 58 for circular flows are opened to Jet air from the air pipe 46 for circular flows to the floating filter media layer 22. The jetted air generates upward-flow of the sewage 18 at the center of the areas A, B, and C, as shown in FIG. 7. The upward flow turns left or right at the water surface, and hits the walls 12A of the treatment tank 12 or the partition 44 and falls as downward which flows to form circular flows in the respective areas A, B, and C. And, the filter medium 20 of the floating filter media layer 22 moves with the circular flows. The filter medium 20 is moved by the circular flows, whereby a shearing power is generated at the interface of the filter medium 20 which move upward in the center of the respective areas A, B, and C and the filter medium 20 which move downward along the walls 12A of the treatment tank 12 or the partition 44. The solid components adhered to filter medium 20 is rubbed and scaled off by this shearing power. The contact resistance of the filter medium 20, which moves downward closer to the walls 12A of the treatment tank 12 or the partition 44, increases, therefore, the moving speed becomes lower as close to the walls 12A of the treatment tank 12 or the partition 44 in spite of the same filter medium 20 which moves downward. Therefore, a shearing power occurs by the moving speed lag of the filter medium 20, so that the solid components adhering to the filter medium 20 can be scaled off easily. Furthermore, the solid components captured by the interior, the mesh, or the projections of the filter medium 20 are scaled off by the air bubbles which Jet upward violently in the centers of area A, B, and C, and the solid components adhering to the filter medium 20 are scaled off by the shearing power of the circular flow. Continued circling of the filter medium 20 exposes the filter medium 20 to the shearing power all around. Time required for washing away solid components from the filter medium 20 depends upon the speed of the circular flow and the circling frequency of the filter medium 20 by the circular flow, ordinarily about 3 to 7 minutes will be appropriate. The first embodiment shows that even in case the ratio of floating filter media layer 22's width/height is large, the treatment tank 12 is divided into several compartments such as areas A, B, and C, so that the circular flows are generated in the respective areas A, B, and C, and in the treatment tank 12 as a whole, whereby the washing capacity can be improved.

Next, after scaling off the solid components by circular moving of the filter medium 20, as shown in FIG. 8, the air valve 58 for circular flow is closed, and while the air valve 60 for full jetting is opened to Jet air to the floating filter media layer 22 as a whole, the discharge valve 30 is opened to discharge the washing waste water 31 with a high solid component concentration by washing the filter medium 20 in the treatment tank 12 into the discharge pipe 32. With this full jetting, the solid components scaled off from the filter medium 20 shall never re-adhere to the filter medium 20, while the washing waste water 31 can be discharged into the discharge pipe 82.

The sewage treatment system 10 according to this invention thus can improve the filtration capacity since the sewage which is moved upward into the treatment tank 12 is filtered by the floating filter media layer 22, which consists of the meshy cylindrical filter medium 20 of the above described structure. In washing the filter medium 20, the circular flows are generated in the sewage 18 in the treatment tank 12 by jetting air from the air pipe 46 for the circular flow to circulate the filter medium 20, whereby the washing performance can be improved. The partition 44 is installed vertically to keep a fixed floating filters media 22's width/height ratio and the circular flows are generated in the respective areas A, B and C, so that even when the floating filters media 22's width/height ratio is large, the filter medium 20 can be washed effectively in a short time. Once solid components are scaled off from the filter medium 20 by the circular flows, the sewage is discharged to the outside of the treatment tank 12 while the floating filter media layer 22 is jetted as a whole, so that there is no fear of solid components re-adhering to filter medium 20 and the filter medium 20 can be washed certainly.

Figure 9:
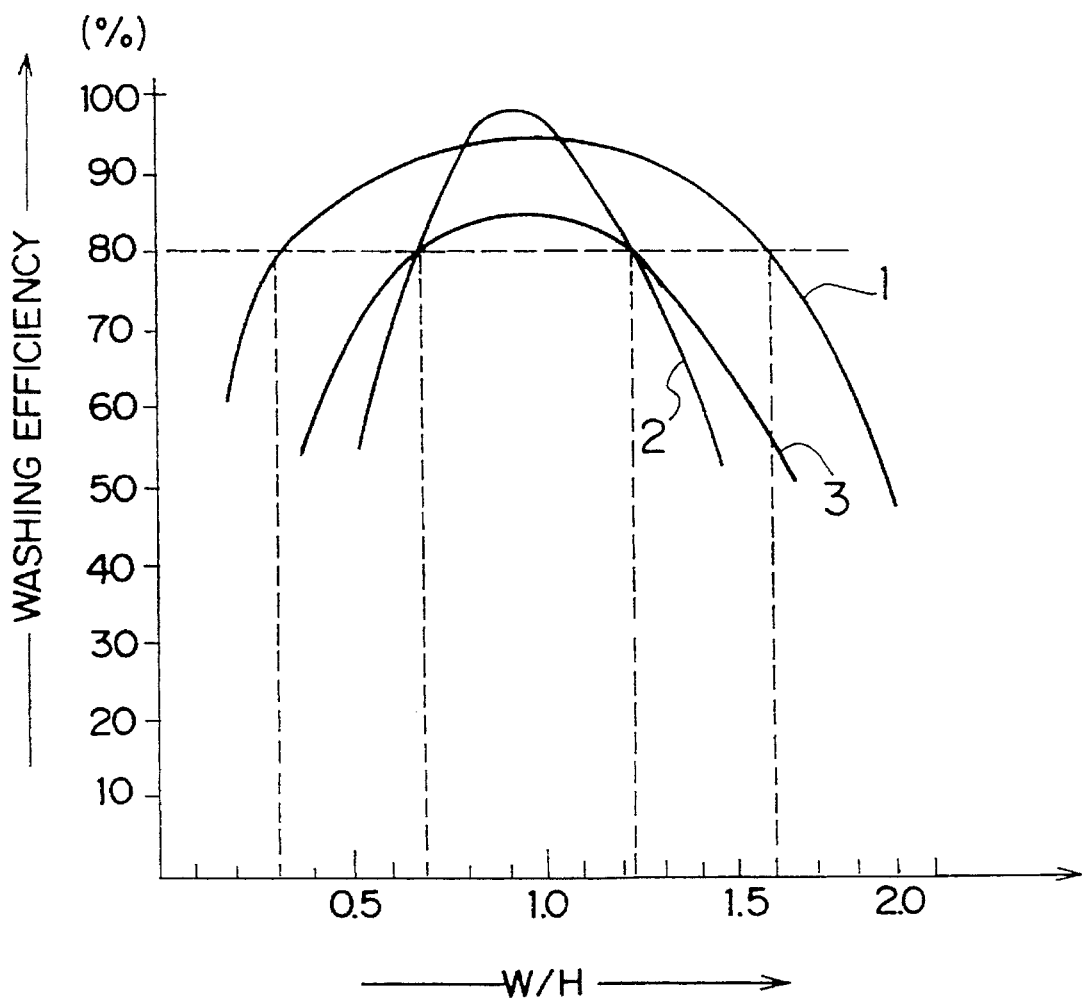
FIG. 9 is an explanatory view explaining the relation between Height and Width ratio (H/W) of the floating filter media layer and cleaning ratio of the filter medium.

And, the washing performance can be remarkably improved by installing the partition 44 to fix floating filters media 22's width/height ratio from 0.3 to 1.6. FIG. 9 shows the correlation between the floating filters media 22's width(W)/height(H) ratio and the washing rate(%) of the filter medium 20. The curve 1 shows the result when the air volume jetted from the air pipe 46 for circular flow is 35 $Nm^3$/filter medium $m^3$·hour. As shown in FIG. 9, a high washing performance of 80% or more is exhibited at W/H ratio from 10.3 to 1.6. Curve 2 shows the result when the air volume is 25 $Nm^3$/filter medium $m^3$·hour, and the curve 3 shows the result when air volume is 50 $Nm^3$/filter medium $m^3$·hour. These results show that when the partition 44 is set to fix W/H ratio from 0.7 to 1.2, though the ratio changes In accordance with the air volume, the washing rate of 80% or more can be obtained in spite of a little vibration of the air volume.

Figure 10:
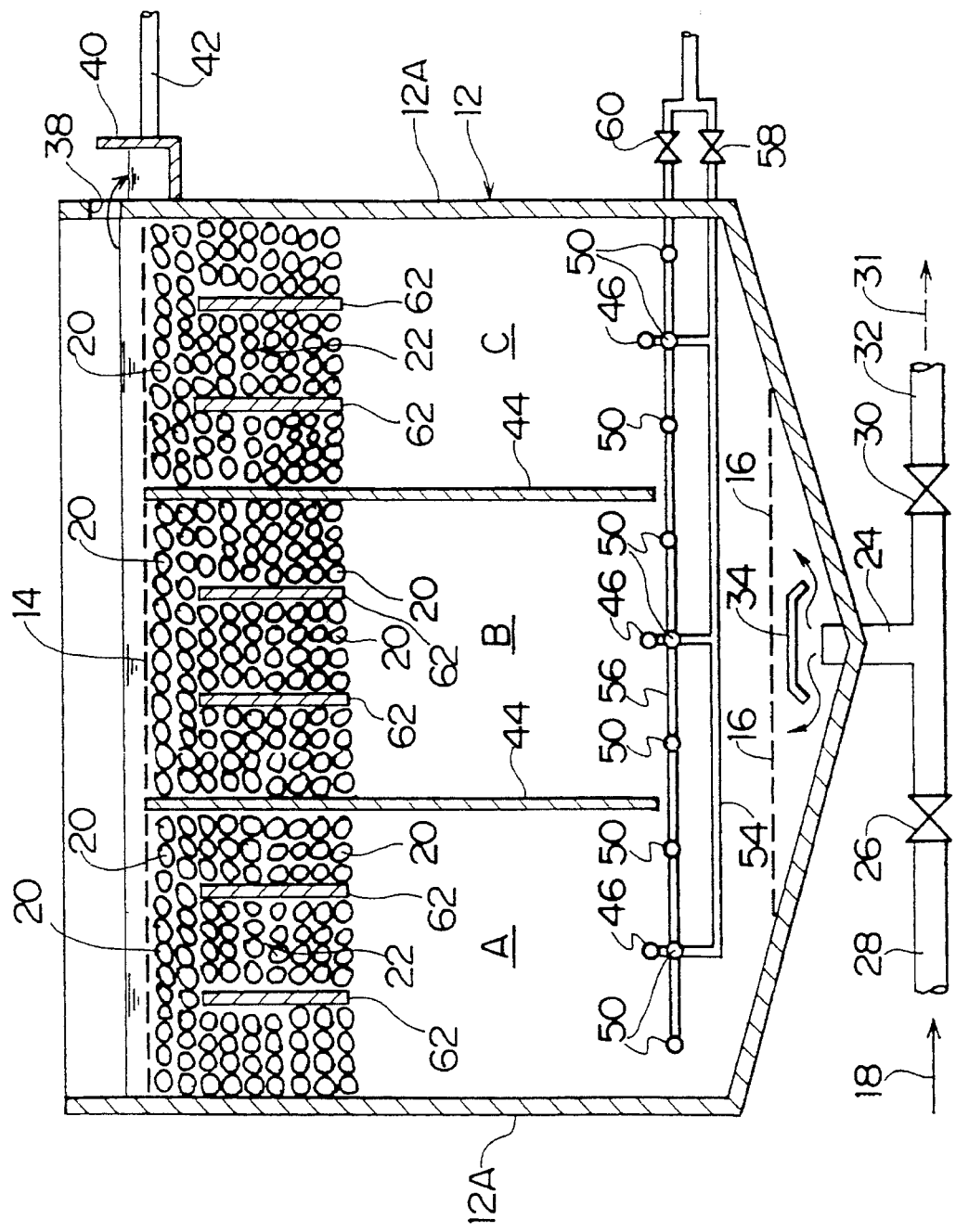
FIG. 10 is a longitudinal sectional view that explains the second embodiment of the sewage treatment system according to this invention.
Figure 11:
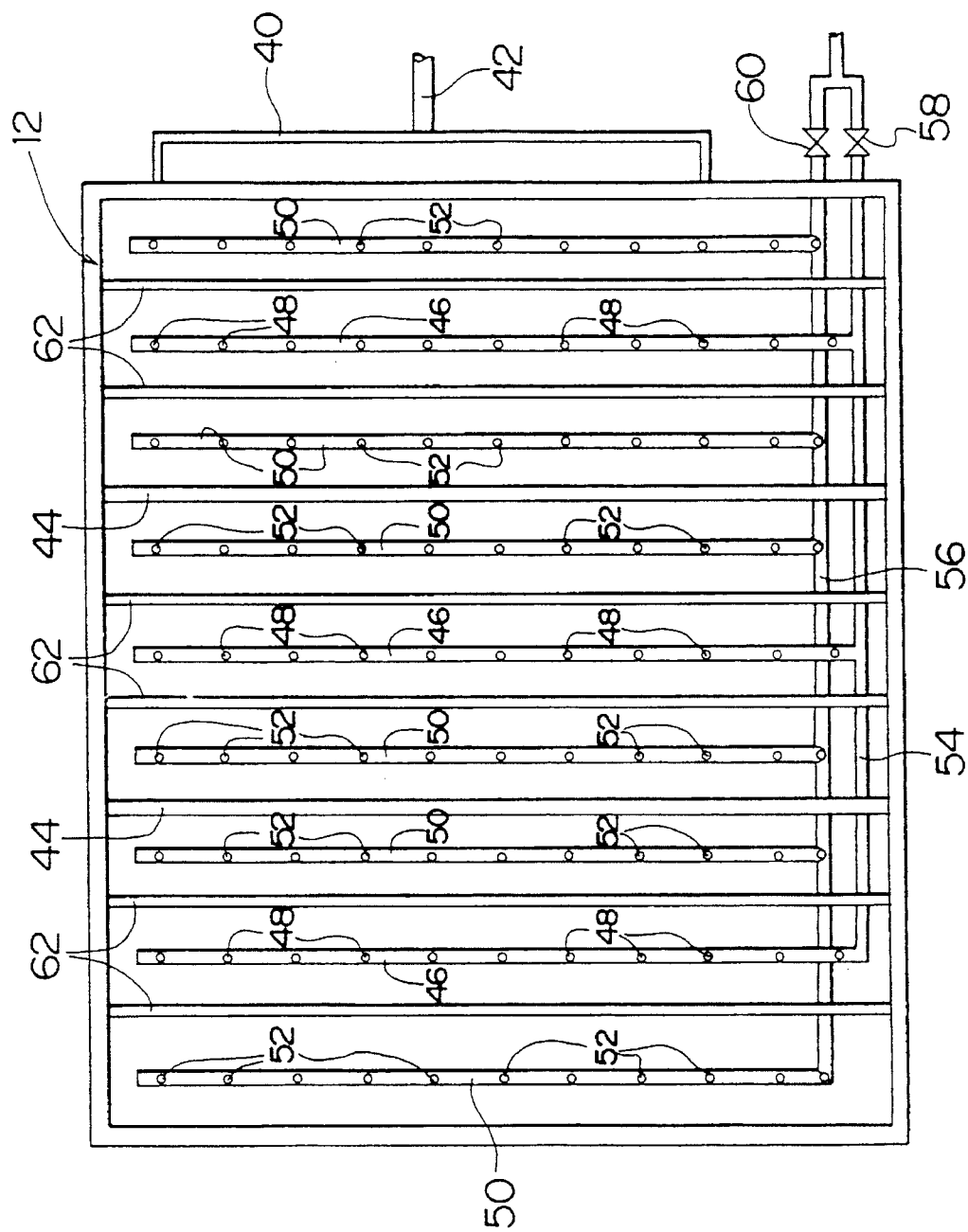
FIG. 11 is a plan view shown from the top of FIG. 10.

Next, a description will be given of the second embodiment of the sewage treatment system according to this invention with FIGS. 10 and 11. FIG. 10 is the sectional view for explaining the second embodiment of the sewage treatment system according to this invention and FIG. 11 is the plan view from the top of FIG. 10 without the floating filter media layer 22. Parts and apparatus common to the first embodiment are explained with the same numeral number. In the second embodiment, a pair of guide plates 62, 62 are placed vertically over and along the air pipe 46 for circular flows to form guide passages. With this arrangement, the filter medium 20 which moves upward and the filter medium 20 which moves downward do not come in contact, whereby the flow resistance can be reduced. Therefore, the circular flows can be generated with less air, so that the power for generating air can be reduced to save the running costs.

Although the shearing power generated between the filter medium 20 which move upward and the filter medium 20 which move downward Is lost in this case, a new shearing power is produced between guide plate 62 and the filter medium 20, so that the same washing performance as the first embodiment can be obtained.

The partition 44 in the treatment tank 12 may be porous such as a punching plate. In this case, the sewage passes through the pores to equalize the pressure in the areas A, B, and C, so that air can be easily and equally jetted into area A, B, and C. And, in FIGS. 10 and 11, the guide plate 62 is installed in parallel along the air pipe 46 for circular flow and the air pipe 50 for full jetting, further, another guide plate (not shown) crossing the guide plate 62 in right angle may be installed to make a cross stripe when over-viewed. With such arrangement, the deviation and pilng of the filter medium 20 caused by the deviation of the air jetting volume (generally, the air jetting pressure is lower as the distance from the air ejection source gets longer) can be provided.

Next, the description will be given of the third embodiment of the sewage treatment system according to this invention with FIG. 12.

Figure 12:
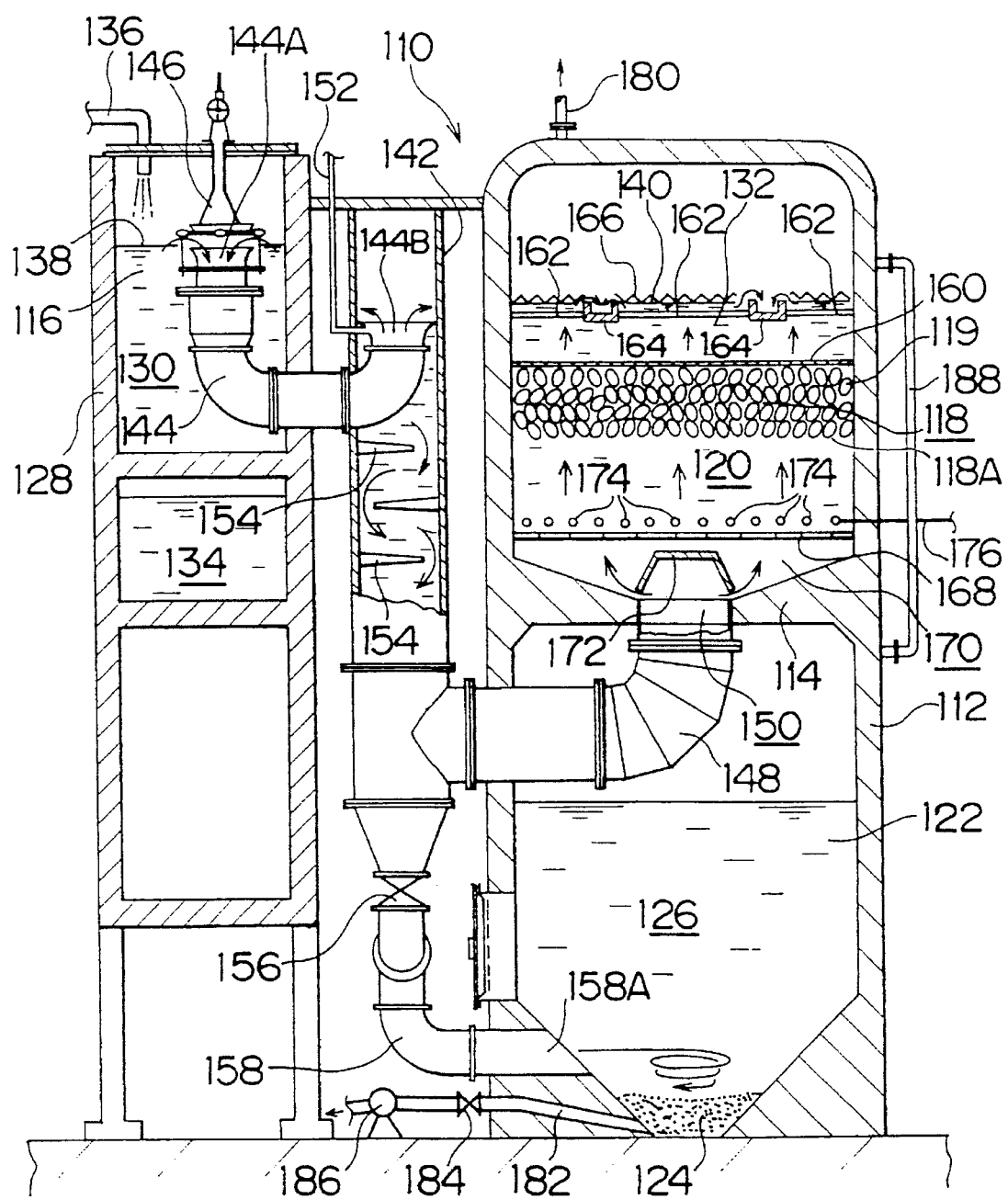
FIG. 12 is a longitudinal sectional view that explains the third embodiment of the sewage treatment system according to this invention.

As shown in FIG. 12, a cylindrical treatment tank 112 is divided into the upper chamber and lower chamber by a horizontal partitive plate 114 located at almost the middle position, and the upper chamber serves as a filtration chamber 120 with the floating filter medium layer 118 to filter the sewage 116 and the lower chamber serves as a sedimentation chamber 126 in which solid components 124 in the washing waste water 122 used for washing the filter medium 119 which form the floating filter media layer 118. The filter medium 119 used here is the same as the first embodiment. And, a storage tank 128 is provided by the treatment tank 112, which is divided into the upper chamber which serves as a raw water storage tank 130 to store the sewage 116 and the lower chamber which serves as a treated water storage tank 134 to store the filtered water 132 by the floating filter media layer 118. The sewage 116 is fed into the raw water storage tank 130 through the raw water supply pipe 136. The water level 138 in the raw water storage tank 130 is maintained at a constant level, and at higher than the water level 140 in the filtration tank 120. A flocculating pipe 142 is located between the treatment tank 112 and the storage tank 128, and a U-shaped raw water receiving pipe 144 is placed for the purpose of passing through the lower side wall of the raw water storage tank 130 and the upper side wall of the flocculating pipe 142. One end of the raw water receiving pipe 144 is opened upward under the water level 138 of the raw water storage tank 130 as a taking opening 144A of the sewage 116. The other end is opened upward at the upper part in the flocculating pipe 142 as a supply opening 144B of the sewage 116. The taking opening 144A of the raw water receiving pipe 144 is positioned higher than the supply opening 144B. With this arrangement, the sewage 116 in the raw water tank 130 flows into the raw water receiving pipe 144 from the taking opening 144A, and then overflows from the supply opening 144B into the upper part of the flocculating pipe 142. The volume and the stopping of taking the sewage 116 from the supply opening 144 are controlled by an electric telescope valve 146. One end of a water sending pipe 148 is connected to the flocculating pipe 142 in the vicinity of the lower part, and the other end is connected to the opening 150 situated at around the center of the partitive plate 114 by passing through the upper side wall of the sedimentation tank 126. At the upper position of flocculating pipe 142, a coagulation pipe 152 is placed, and plural baffling plates 154, 154 . . . are located horizontally in the flocculating tank 142. Coagulant is added to the sewage 116 from the coagulation pipe 152, and then the sewage 116 circles by the baffling plate 154 and flows down in flocculating pipe 142 to thereby flocculate. The lower end of the flocculation pipe 142 is linked with the lower part of the sedimentation tank 126 through the washing waste water pipe 158 via the washing waste water valve 156.

Next, a description will be given of the structure in the filtration chamber 120 in the treatment tank 112. A grating plate 160, which is formed by a fine grate, which is located horizontally in the upper part of the filtration tank 120, and under the grating plate 160, where numerous filter mediums 119 which have the above-mentioned structure are floated and fixed in sewage 116 to form the floating filter media layer 118. The height of the floating filter media layer 118, and the ratio of the filter tank 120 height/floating filters media 118 height is the same as the first embodiment. In the upper part of the grating plate 160, a trough 164 is located by an arm 162 which is supported by the internal wall of the filter tank 120, the filtered water 132 filtered by the floating filter medium layer 118 is overflown thereto. The filtered water 132 overflown into the trough 164 is sent to the treated water storage tank 134 of the storage tank 128 through the treated water pipe, not shown. On the surface 140 of the treated water 132, a wavy wear plate 166 is arranged. In the vicinity of the baffling plate 14 and under the floating filter media layer 118, a straightening plate 168 of coarse grating structure is installed across the filtration tank 120, and a dispersion area 170 is made between the straightening plate 168 and the baffling plate 114. A distribution plate 172 is placed near the opening 150 of the baffling plate 114.

Figure 13:
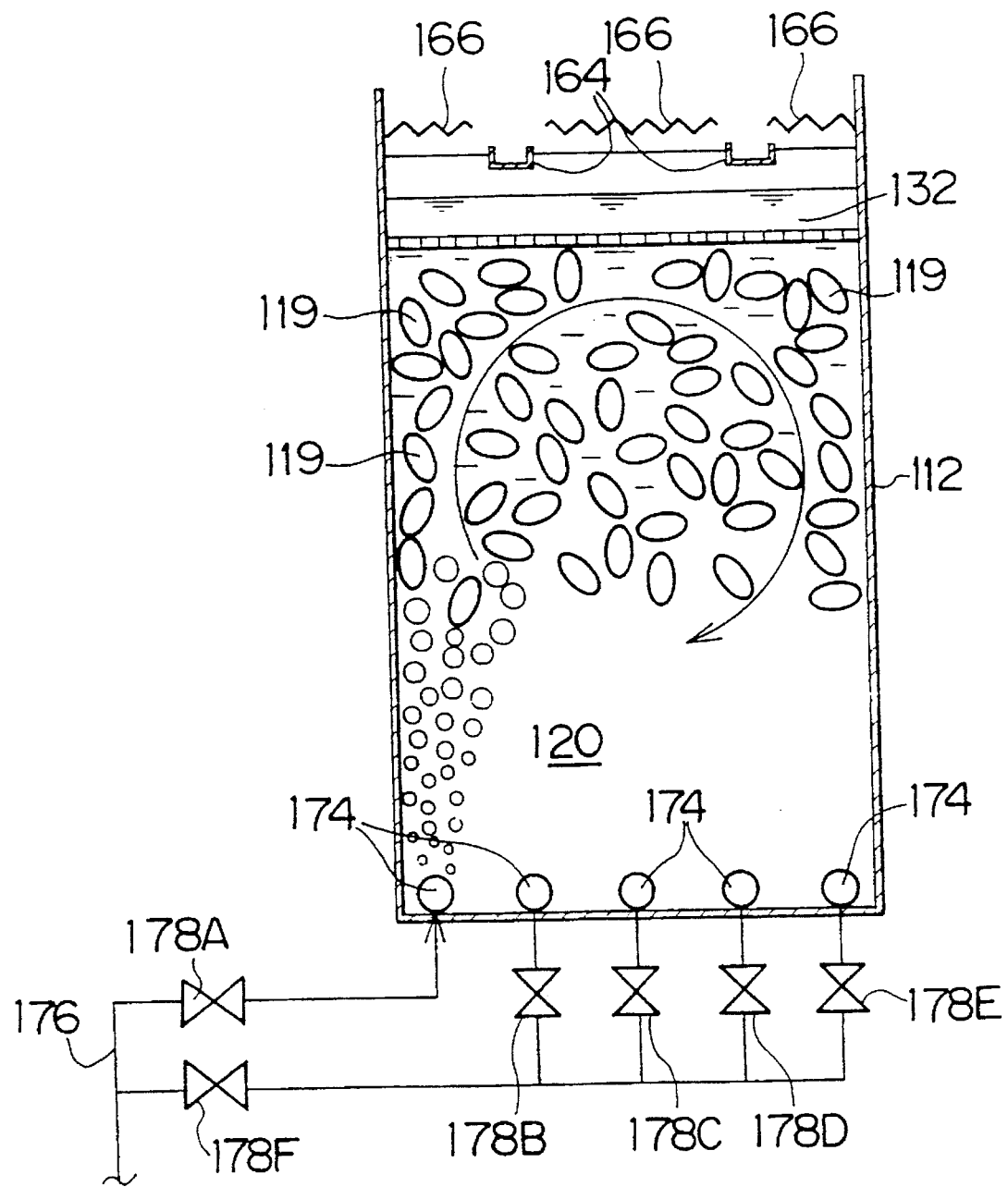
FIG. 13 is an explanatory view explaining a state that filter medium are circulated by air while washing the filter medium in the third embodiment.
Figure 14:
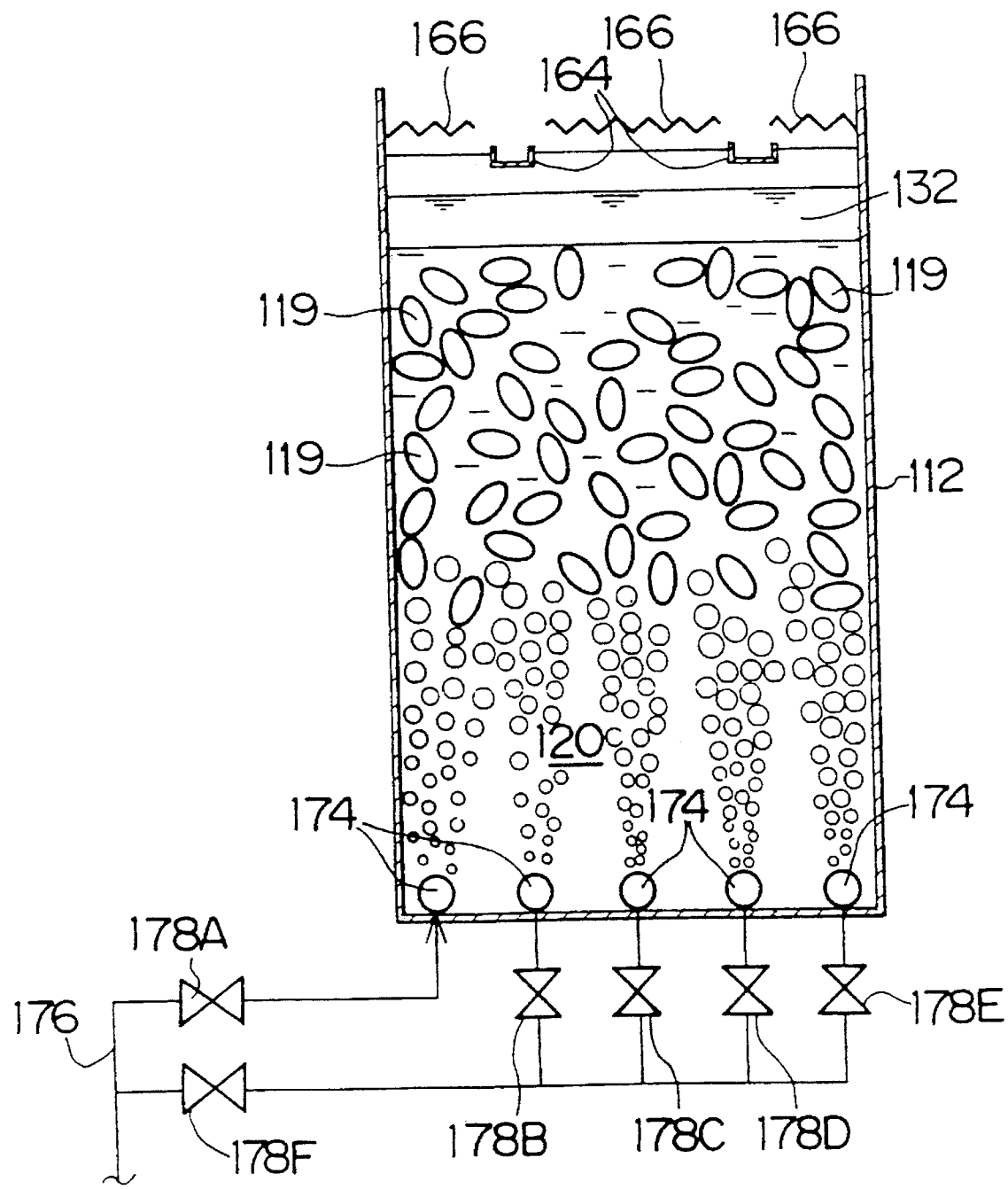
FIG. 14 is an explanatory view explaining a state that air is jetted to filter medium in whole while washing the filter medium in the third embodiment.

An air pipe 176 which has numerous air nozzles 174, 174 . . . which jet air toward the floating filter media layer 118 is placed over the straightening plate 188, and is connected with a compressor, not shown. The detailed description has been given of air jetting mechanism with FIGS. 13 and 14. Air nozzle valves 178A, 178B, 178C, 178D, 178E, and 178F are provided with the air pipe 178, and air nozzles 178B, 178C, 178D, and 178E are set normally open. For example, when only the air nozzle 178A is opened to jet air, a circular flow can be generated to the sewage in the filtration tank 120 as shown in FIG. 13. And, when the air nozzle 178A is closed and the air nozzle 178F is opened, the floating filter media layer 118 in the filtration tank 120 can be jetted as a whole as shown in FIG. 14.

At the ceiling of the filtration tank 120 an exhaust pipe 180 is provided for air emission. The air is 3erred from the air nozzle 174 to generate circular flows in the sewage 118 and jetted to the floating filter media layer 118 as a whole, and then is emitted through the exhaust air pipe 180.

Next, the structure of the sedimentation chamber 128 in the treatment tank 112 will be described. the upper part of the sedimentation chamber 126 is cylindrical and the lower part is formed in a reverse cone, and the sedimentation chamber side exit 158A of the washing waste water pipe 158 situates along the internal side wall of the reverse cone sedimentation chamber 128. Thus, the washing waste water flown to the sedimentation chamber 128 from the washing waste water pipe 158 forms a circular flow. An extracting pipe 182 runs through the lower inner side wall of the sedimentation chamber 128, and connects with the sludge treatment system, not shown, through an exacting valve 184 and an extracting pump 188.

The upper space of the filtration chamber 120 is linked with the upper space of the sedimentation chamber 128 through air vent pipe 188, so that there is no air pressure gap between filtration chamber 120 and sedimentation chamber 126.

Next, a description will be given of the operation in the sewage treatment tank 110 according to this invention.

First, the filtration operation will be described. The filtration operation starts from closing the washing waste water valve 156 and opening a telescope valve at the given value to control the receiving volume of the sewage 116 taken from the taking opening 144A of the raw water receiving pipe 144. That is, when the telescope valve 146 is opened and the washing waste water valve 156 is closed, the raw water storage chamber 180 and the filtration chamber 120 in the storage tank 128 are linked by a U-shaped pipe through the raw water receiving pipe 144, the flocculating pipe 142, and the sending water pipe 148, and further, the level of the water surface 188 of the U-shaped pipe in the side of the raw water storage chamber 180 is arranged to be higher than the water surface 140 in the side of the filtration chamber 120. With this arrangement, the water head difference causes the sewage 116 stored in the raw water storage tank 180 to flow into the flocculating pipe 142 through the taking opening 144A of the receiving pipe 144, and flows downward in the flocculating pipe 142 and flows into the filtration chamber 120 through the sending water pipe 148 from the bottom of the filtration chamber 120. The sewage 116 flown into the filtration chamber 120 flows upward through the straightening plate 168 and then passes through the floating filter media layer 118 to overflow into the trough 164. The sewage treatment system 110 of this invention needs no power source since the upward flow is generated in the filtration chamber 120 by supplying the sewage 116 into the filtration chamber 120, therefore, energy can be saved. The baffling plate 154 is installed in the flocculating pipe 142 and the sewage 116 flows circularly down in the flocculating pipe 142 while passing through the flocculating pipe 142, therefore, the solid components 124 in the sewage 116 are flocculated before entering to the filtration chamber 120. Therefore, the solid components 124 in the sewage 116 can be captured easily by the filter medium 119 when the sewage 116 is filtered by the floating filter medium layer 118.

When the filtration operation is continued, the solid components 124 in the sewage 116 adhering to the filter medium 119 increase. The filter media washing operation is explained in the case that the filtration performance is decreased. First, the telescope valve 146 shields the taking opening 144A of the raw water receiving pipe 144 to prevent the sewage 116 from flowing into the taking opening 144A. Next, the washing waste water valve 156 is opened to connect the filtration chamber 120 and the sedimentation chamber 126 to brine down the water level of filtration chamber 120. When the level in the filtration chamber is lowered, the washing waste water valve 156 is closed. The reason for lowering the water level in the filtration chamber 120 is to prevent the solid components 124, which are scaled off from the filter medium 119 during the washing process of the filter medium 119, from overflowing into the trough 164. Then, the air nozzles 178A and 178F are opened and closed alternately from time to time to generate air bubbles to the sewage 116 in the filtration chamber 120, as well as to generate circular flows and the like to scale the solid contents 124 off from the filter medium 119 which adhered to filter medium 119. When the solid components 124 are scaled off from the filter medium 119 completely, the air nozzle valve of 178A is closed and the air nozzle 178F is opened, the washing waste water valve 156 is opened while the floating filter media layer 118 is jetted as a whole, and then the washing waste water 122 used for washing the filter medium 119 is sent to the sedimentation chamber 126 via the water pipe 148 and the washing waste water pipe 158. At this time, the sedimentation chamber side 158A of the washing waste water pipe 158 is installed along the inner side wall of the reverse cone sedimentation chamber 120 so that washing waste water 122 flown from the washing waste water pipe 158 to the sedimentation chamber 126 becomes a circular flow. With this arrangement, the centrifugal power is applied on the solid components 124 in the washing waste water 122, so that the solid components 124 in the washing waste water 122 circulate along the reverse cone wall. Therefore, by merely standing still for a short period in the sedimentation chamber 126, the solid components 124 in the washing waste water 122, can be sedimented and separated, so that the treatment of the washing waste water 122 can be quickened. Then, After complete transfer of the washing waste water 122 to the sedimentation chamber 126 is performed, the washing waste water valve 156 is closed, and the telescope valve 146 is opened to resume the filtration operation. Then, the washing waste water 122 of the sedimentation chamber 126 stand still for a specified time during the filtration process, and the solid components 124 in the washing waste water 122 are sedimented. When the sedimentation and separation of the solid components 124 in the washing waste water 122 is complete, the drawing out valve 184 of the drawing out pipe 182 is opened to start the exhaust pump 186, and the sedimented solid components 124 are sent to the sludge treatment process. When the sedimented sludge is taken out completely, the switching valve, not shown, of the drawing out pipe 182 is switched and the supernatant liquid is sent to the next process.

Thus, the sewage treatment system 110 according to this invention sends the sewage 116 from the raw water storage chamber 130 to the filtration chamber 120 by the water head difference caused by the water head difference between the raw water storage chamber 130 and the filtration chamber tank 120, and generates upward flows in the filtration chamber 120 to filter by the floating filter media layer 118. As the results, power source to supply the sewage 116 to the filtration chamber 120 is not required, so that energy can be saved.

And, the filtration chamber 120 and the sedimentation chamber 126 are integrated into one unit vertically, and the several air nozzles 174 are installed at the lower part of the floating filter media layer 118, so that when the filter medium 119 are contaminated, the sewage 116 is circulated or air bubbles are generated in the sewage 119 to scal the solid components 124 adhered to the filter medium 119 off, and the washing waste water 122 containing the scaled off solid components 124 is sent to the sedimentation chamber 126 to be sedimented and separated. Therefore, the washing operation of the filter medium 119 can be simplified and the volume of the washing waste water 122 can be decreased by far, compared to the conventional sewage treatment system, wherein the filter medium 119 are moved to the filter recycling device and cleaned with the cleaning water.

And, in the sewage treatment plant 110 according to this invention, the volume of the washing waste water 122 is small and Just about the same as the capacity of the filtration chamber 120, therefore, the treatment tank 112 can be integrated by combining the filtration chamber 120 and the sedimentation chamber 126 in a single vertical unit. Thus, the sewage treatment plant 110 according this invention offers both the filtration capability of the sewage 116 and the treatment capability of the washing waste water 122, therefore, the sewage treatment system can be made compact, compared with the conventional sewage treatment system wherein the filtration function and the washing waste water treatment function are separated. By placing the sedimentation chamber 126 under the filtration chamber 120, the potential energy is generated, and utilized to move the washing waste water 122 to the sedimentation chamber 126, without any power source requirement. Therefore, the sewage treatment plant 110 according to this invention requires no power source in particular to feed the sewage 116 to the filtration chamber 120, and to move the washing waste water 122 from the filtration chamber 120 to the sedimentation chamber 126, therefore, a lot of energy can be saved.

Figure 15:
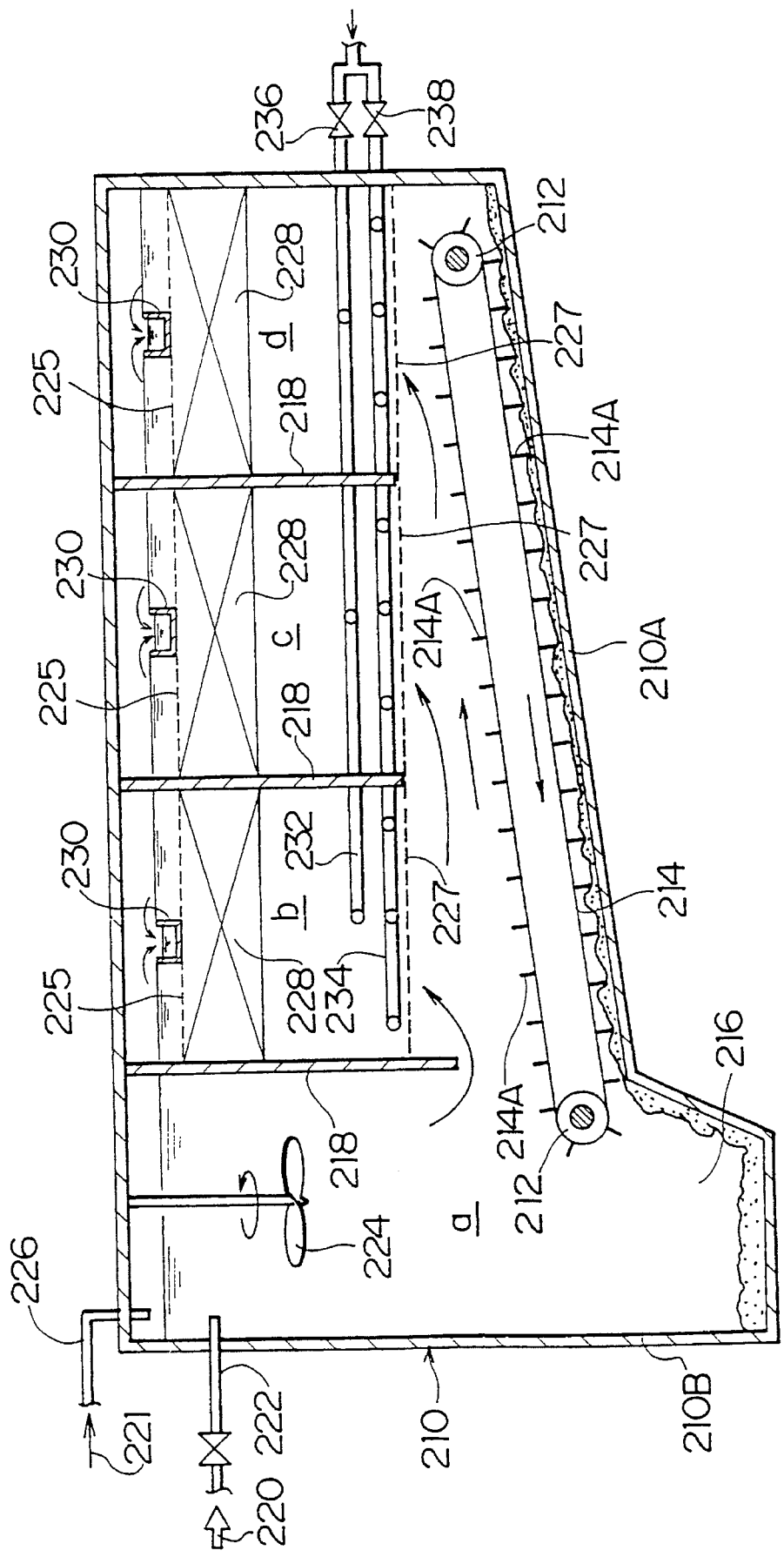
FIG. 15 is a longitudinal sectional view that explains the fourth embodiment of the sewage treatment system according to this invention.

Next, a description will be given of the fourth embodiment of the sewage treatment system according to this invention with FIG. 15. The fourth embodiment relates to the sewage treatment system, in which the sedimentation separation process which solid components of large propensity of the sedimentation in the sewage are sedimented and separated, and the high speed filtration by the floating filter media layer. As shown in FIG. 15, the bottom 210A of the treatment tank 210 is tilted and a caterpillar belt 214 with a rake 214A is hung on pulleys 212, 212 on both ends of the tilted bottom 210A. A sludge storage tank 216 is provided on the lower side of the tilted bottom 210A for collecting the sludge scraped by the caterpillar belt 214 with the rake. Partitive walls 218,218,218 are located in the treatment tank 210 for dividing the treatment tank 210 into, for example, four areas a, b, c, d vertically, and the baffling plate 218 divides from the top of the treatment tank 210 to about the midway thereof. A raw water pipe 222 into which the sewage 220 flows is provided through the side wall 210B of the sludge storage tank 216 in the treatment tank 210. A stirrer 224 is located in the area a, which situates closest to the raw water pipe 222 into which the sewage 220 inflows, among the areas a, b, c, and d, and a coagulation pipe 226 for adding the coagulant 221 is arranged. In the remaining areas b, c, d, there is a floating filter media layer 228 with the same constitution as the first embodiment, consisting of numerous filter medium which float under the upper screen 225, and the sewage which inflows to the treatment tank 210 is filtered. And, a trough 230 is provided at each liquid surface and the filtered water filtered by the floating filter media layer 228 overflows. Under the floating filter media layer 228 in each area b, c, d, a air pipe 232 for circular flow to generate circular flows, and a air pipe 234 for full jetting to jet air as a whole are located. The respective pipes 232 and 234 are connected with a compressor, not shown, through the circular flow valve 236 and the full jetting valve 238. Under the pipes 232 and 234, there is a lower screen 227 to prevent spilling oover of the filter medium from the areas b, c, d.

In the sewage treatment system of such construction, the sewage which flows to the area a of the treatment tank 210 from the raw water pipe 222 is added with a predetermined value of the coagulant through the coagulation pipe 226, and stirred by the stirrer 224. Therefore, the solid components in the sewage are flocculated, and flow respectively into the areas b, c, d with the floating filter media layer 228. At this time, a part of the flocculated solid components settles on the bottom 210A of the treatment tank 210, and is scraped by the caterpillar belt 214 with the rake and collected into the sludge storage tank 218. Unsettled solid components are filtered by the floating filter media layer 228. Such process lessens the filtration load of the floating filter media layer 228 by reducing the concentration of solid components in the sewage, which pass through the floating filter media layer 228. As a result, the filtration capacity of the floating filter media layer 228 can be maintained for a long time, and washing frequency by the air pipe 282 for circular flow and the air pipe 234 for full jetting can be reduced. When the filtration capacity declined, air is jetted from the air pipe 232 for circular flow and the air pipe 234 for full jetting to wash filter medium, and the solid components scaled off from the filter medium and settled are scraped by the caterpillar belt 214 with the rake and collected in the sludge storage tank 216.

Figure 17:
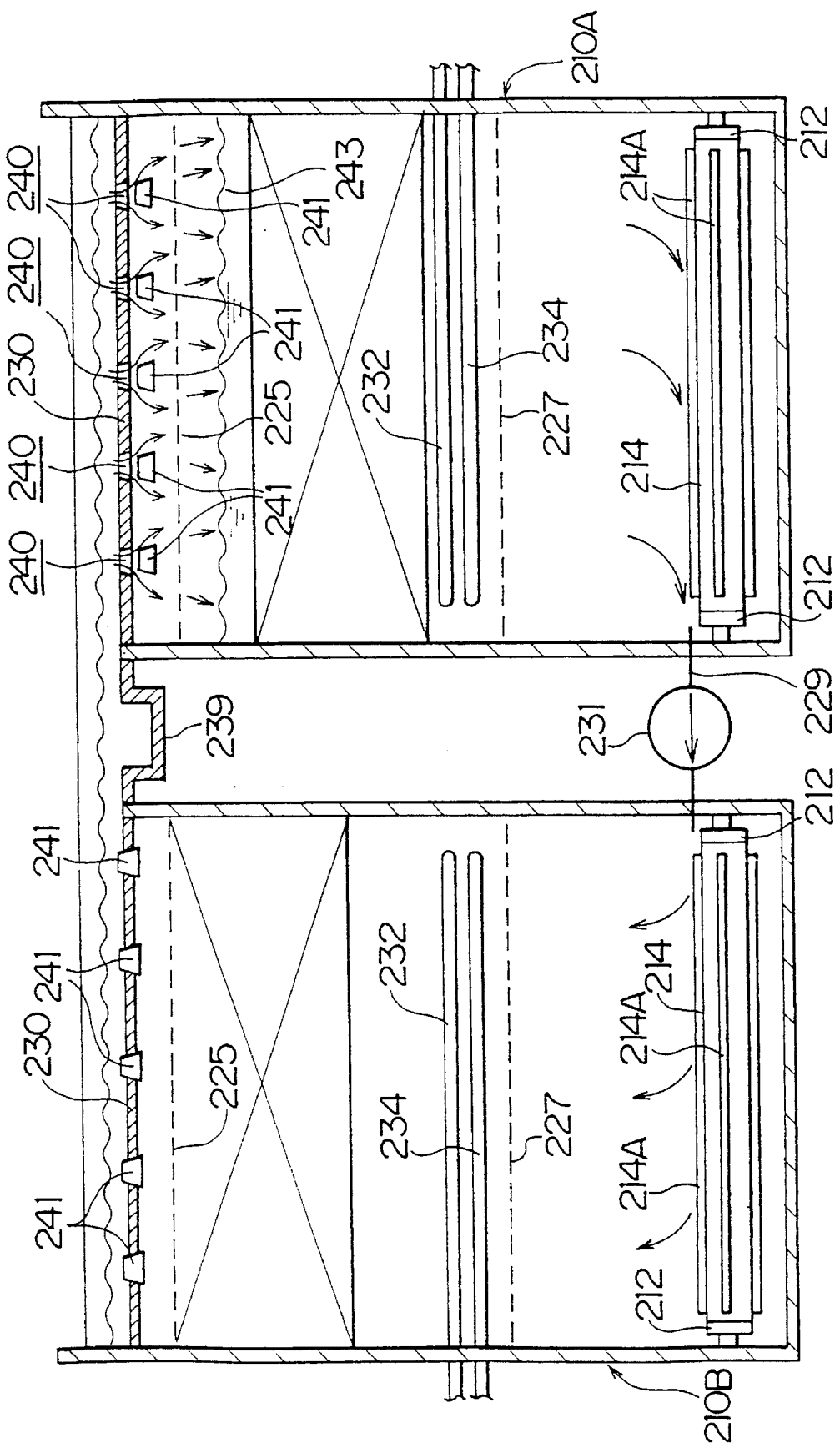
FIG. 17 is a longitudinal sectional view for explaining the fifth embodiment of the sewage treatment system according to this invention.
Figure 18:
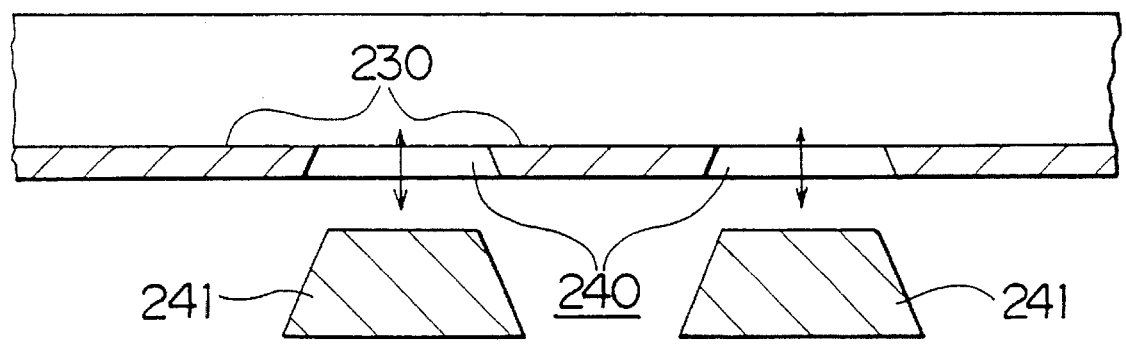
FIG. 18 is a sectional view explaining the underdrain of the fifth embodiment of the sewage treatment system according to this invention.

Next, a description will be given of the fifth embodiment of the sewage treatment system according to this invention with FIGS. 16, 17 and 18. Parts and apparatus which are common with the fourth embodiment are explained with the same numeral numbers. To give the explanation easily, in FIG. 16, the upper side of the sewage treatment system is a first tank 210A, and the lower side of the sewage treatment system is a second tank 210B, and in FIG. 17, the right side, and the left side of sewage treatment system are respectively quoted as the first tank 210A and the second tank 210B.

Figure 16:
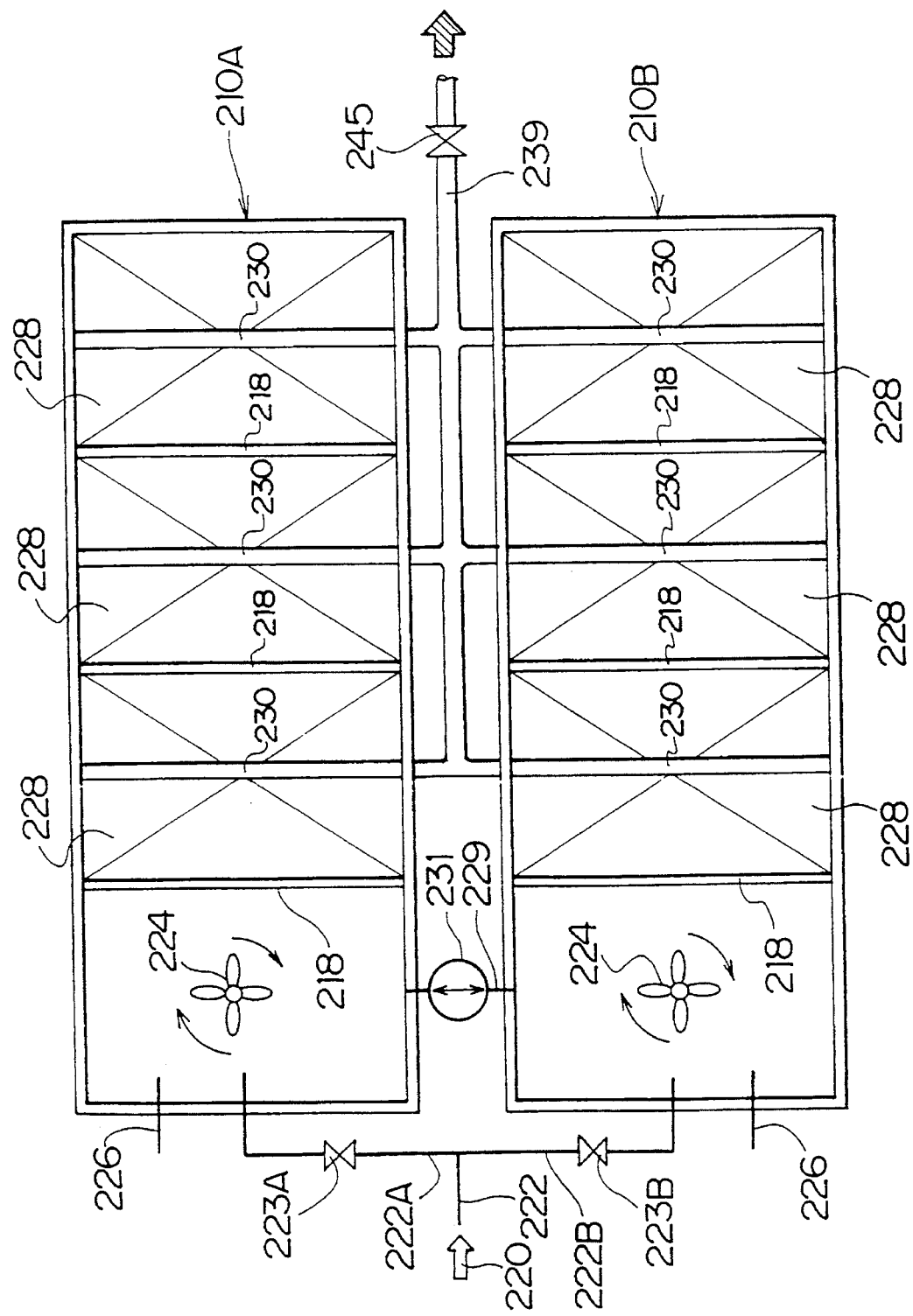
FIG. 16 is a plan view shown from the top for explaining the fifth embodiment of the sewage treatment system according to this invention.

As shown in FIG. 16, in the fifth embodiment, the sewage treatment systems in the fourth embodiment are linked in parallel. Namely, the raw water pipe 222 diverts in the middle, whereas the first raw water pipe 222A is installed in the first tank 210A, and the second raw water pipe 222B is installed in the second tank 210B. In the first raw water pipe 222A and the second raw water pipe 222B, a first raw water valve 228A and a second raw water valve 223B are respectively installed. The first tank 210A and the second tank 210B are linked by the connecting pipe 229, and a reversible pump 281 (which pumps from the first tank to the second tank and vice versa) with the connecting pipe 229 is provided. The connecting pipe 229 has a coagulant adding opening, not shown. The trough 280 located on the upper side of each floating filter media layer 228 is connected with the water receiving trough 239, and the water receiving trough 239 has a water release control valve 245. On the bottom of the trough 230, there are several round openings 240 as illustrated in FIG. 18, and the openings 240 is opened or shut by the cone plugs 241 when in case of need. An explanation of a switching mechanism for the plugs is omitted.

According to the sewage treatment system structured in this way, the operation can be performed as follows. First, the first influent valve 223A is shut and the reversible pump 231 is started to pump water from the first tank 210A to the second tank 210B, and the water surface 243 in the first tank 210A is lowered below the upper screen 225. Parallel to such operation, the opening of the release control valve 245 in the water receiving trough 239 is tightened, and the plug 241 is removed from the water receiving trough 239's opening 240, and the opening 240 is opened. As a result, the filtered water filtered by the floating filter media layer 228 in the second tank 210B flows to the trough 230 of the second tank 210B, the water receiving trough 239 and the trough 230 of the first tank 210A, and then flows into the first tank 210A from the opening 240. Therefore, the filter medium can be washed with clean and fresh filtered water, whereby the cleaning efficiency can be improved. At this time, the opening of the release water control valve 245 is controlled in accordance with the sent water volume by the reversible pump 231, whereby the water surface level 243 in the first tank 210A can be variable thereby, the filtered water flown from the opening 240 of the water receiving trough 239 may be used for showering the filter medium. Subsequently, the filtered water which has been filtered by the floating filter media layer 228 in the second tank 210B can be used to wash the floating filter media layer 228 in the first tank 210B. Furthermore, the washing waste water, which contains large amount of solid components, may be cleaned again in the second tank 210B. Therefore, the washing efficiency of the filter medium is improved, and the operation without washing waste water can be performed.

For washing the filter medium, air is jetted to the floating filter media layer 228 as a whole by the air pipe 234 for full jetting, in addition to generating circular flow by the air pipe 232 for circular flows.

While the filter medium are washed In the first tank 210A, the high rate filtration through the floating filter media layer 228 and the sedimentation to the bottom of the tank 210B are performed. At this time, as the first influent valve 223A of the first tank 210A is shut, the influent volume of the sewage 220 into the second tank 210B doubles (the sewage 220 which is flown into the first tank 210A flows into the second tank 210B). Therefore, a predetermined value of the coagulant is added through the second tank 210B's coagulation pipe 226, and the coagulant is added in the connecting pipe 229. Consequently, the high rate filtration of the sewage 220 by the floating filters media 228 and the sedimentation to the bottom of the tank 210B are performed while adding coagulant, therefore, the cleansing capability of the sewage can be improved in compared with coagulantless, to maintain high quality of filtered water.

After washing of the filter medium in the first tank 210A, the reversible pump 231 is stopped, and the addition of the coagulant through the coagulation pipe 226 and the connecting pipe 229. the opening 240 of the water receiving trough 239 is shut of the first tank 210A with the plug 241, the water release valve 245 is closed to the original position, and the first influent valve 223A is opened. In this way, the parallel operation of the coagulantless sewage treatment operation in the first tank 210A and the second tank 210B is performed.

Further, in cleaning of the filter medium in the second tank 210B shall be done by reversing the relation between the first tank 210A and the second tank 210B in the above mentioned process.

Thus, according to the fifth embodiment, the filter medium can be washed without lessening the volume of the treated sewage, and no washing waste water is discharged into public waters.

Next, the description will be given of the sixth embodiment of the sewage treatment system according to this invention.

Figure 19:
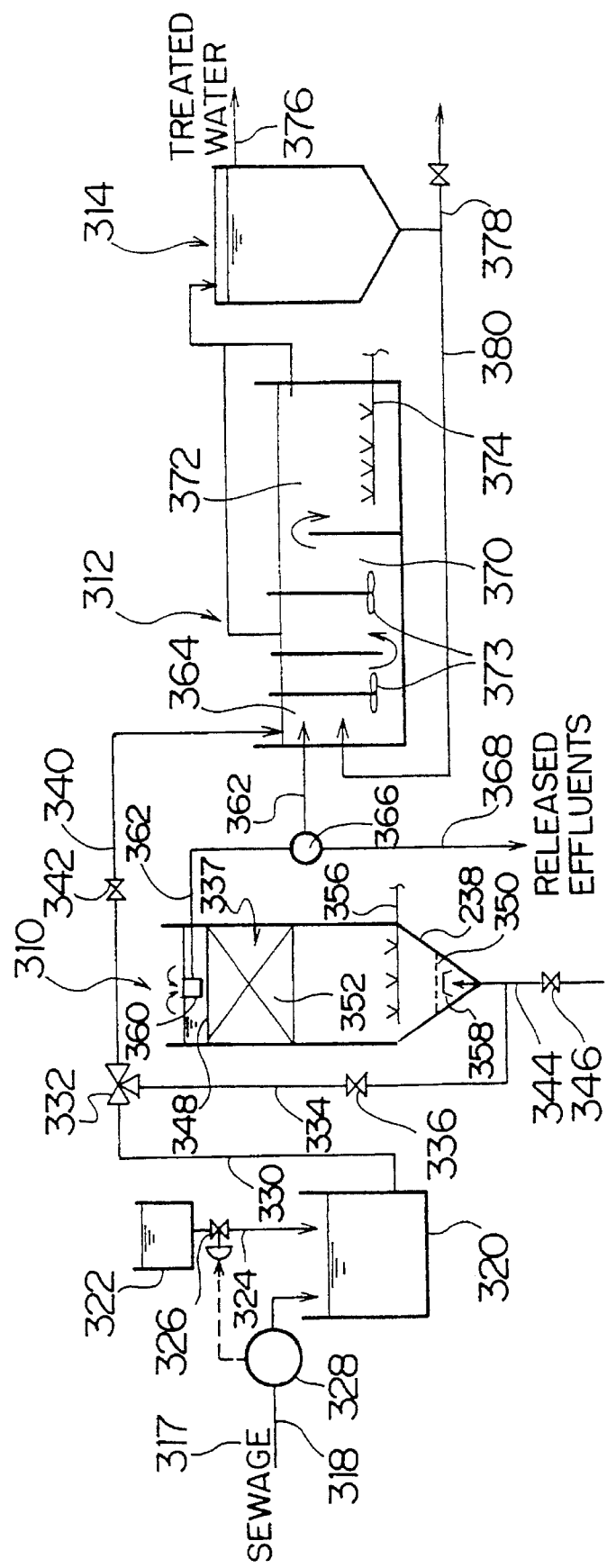
FIG. 19 is a constitutional view of the flow for explaining the sixth embodiment of sewage treatment system according to this invention.

FIG. 19 is the constitutional view of the flow for explaining the sixth embodiment. In the sewage treatment system according to this invention, the biological treatment is performed after the high speed filtration, and it primarily consists of a high speed filtration plant 810, a biological treatment plant 312 and a sedimentation tank 314. FIG. 19 shows only one sewage treatment system for the sake of simple explanation, but several sewage treatment systems may be installed.

As illustrated in FIG. 19, the sewage flows into the raw water tank 820 through the raw water pipe 318. Nearby the raw water tank 820, there is a coagulant storage tank 322 to store liquid coagulant, and the coagulant in the coagulant tank 322 is added to the raw water tank 820 through the coagulation pipe 824. The additive valve 826 provided in the coagulation pipe 324 is connected to the fluid meter 328 at the raw water pipe 818 via a signal cable. According to this, the additive valve 826 opens when the influent sewage volume reaches a certain level to add the predetermined coagulant to the raw water tank 320. Inorganic coagulants such as aluminum sulfate, poly aluminum chloride, and ferric chloride, or polymer coagulants such as anion, nonion, and cation are used as the coagulant. The supply pipe 330 extending from the bottom of the raw water tank 320 is divided into two by the trigonal valve 332, and one filtration pipe 334 is connected to the bottom of the filtration tank 338 of the high rate filtration plant 310 via the raw water valve 336 and the other, the bypass pipe 340 is connected to the entrance of the biological treatment plant 312 via the bypass valve 342. The raw water valve 336 is kept open during the filtration process, and it is kept shut to stop the flow of the sewage to the high rate filtration plant 310 during the washing the floating filters media 337 (mentioned later). The bypass valve 342 is opened whenever necessary to allow a part of the raw sewage to flow directly to the biological treatment plant 312. With this arrangement, organic components which are the source of nutrition in the activated sludge added to biological treatment plant 312 can be kept more to a predetermined level.

The filtration pipe 334 diverts around the entrance of the filtration tank 338, and is connected with the washing waste water discharge pipe 344 for discharging the washing waste water which washed the filter medium out of the filtration tank 338. In the washing waste water discharge pipe 344, there is the washing waste water discharge valve 346, which is shut during the filtration operation at the high rate filtration plant 310.

The filtration tank 338 of the high rate filtration plant 310 has a square top, and the bottom is formed in a square cone. At the upper part and the lower part un the filtration tank 338, there are a meshy upper screen 348 and a meshy lower screen 350 across the filtration tank 338. The mesh size of the upper screen 348 should be small enough to block the filter medium, and that of lower screen 350 should be small enough to remove large impunity. Under the upper screen 348, numerous filter medium 352 with the same structure as described in the first embodiment are floated and fixed to form the the floating filter media layer 337. The floating filter media layer 337's height/the filtration tank 338's height ratio is also the same as described in the first embodiment At the lower side of the floating filters media layer 337, there is a air jet pipe 356 with several jet nozzles near around lower screen 350 near the lower screen, which ejects air in the sewage to generate circular flows to move the filter medium circularly, so as to wash away solid components adhering to filters 352 within a short time and efficiently. At the lower part of the filtration tank 338, there is the dispersion plate 358 which disperses the sewage, which has already flown into the filtration tank 338, throughout the filtration tank 338. Consequently, the sewage, which flows into the lower part of filtration tank 338 from influent tank 320, is dispersed throughout the filtration tank 338 by the dispersion plate 358, and flows upward in the filtration tank 338. Over the upper screen 348 of the filtration tank 338, there is a trough 360 which receives the overflow of the filtered water filtered by floating filters media 337. The filtered water overflown into the trough 360 is carried to the anaerobic tank 364 of the biological treatment plant 312 via the biological treatment pipe 362.

The biological treatment pipe 362 is connected to the release pipe 368 via the distribution plant 366 in the midway. The distribution plant 366 distributes the volume of filtered water to be supplied to the biological treatment tank 312, and the volume of the filtered water to be supplied to the release pipeline 368 at a fixed ratio, so that a part of the filtered water may be released to public waters such as river directly.

As for the biological treatment plant 312, it consists of an anaerobic tank 864, a denitrification tank 370 and a fitrification tank 872. Activated sludge which contains such as nitrification bacteria, denitrification bacteria and integrated phosphorus bacteria is added to the anaerobic tank 364, the denitrification tank 370 and the nitrification tank 372. Particularly for the nitrification tank 372, a carrier wrapped in macropolymer container with about 3 mm size is added, in addition to the above activated sludge. This saves nitrification time. In the anaerobic tank 364 and the denitrification tank 870, there is a stirrer 378, which stirs slowly, whereby the biological treatment reaction is applied to the filtered water flown from the high rate filtration plant 310 in a anaerobic state. In the nitrification tank 372, there is an aeration device 374, which generates biological treatment reaction in the anaerobic state. Then, the filtered water filtered by the high rate filtration plant 810 is flown through the anaerobic tank 864, the denitrification tank 370 and the nitrification tank 372 sequentially, and a constant volume of nitrate liquid is circulated in denitrification tank 370, whereby nitrogen components in the filtered water are removed. By passing filtered liquid through the anaerobic tank 364, the denitrification tank 370 and nitrification tank 372, the activated sludge incorporates organic matters in the anaerobic state (the state without oxygen and oxidized state nitrogen), and phosphorus accumulated in activated sludge is released. At the aerobic state in the nitrification tank 372, the activated sludge reabsorbs phosphorus, and the phosphorous components in filtered water can be removed as absorption becomes more than the released volume at the end.

The water treated in the biological treatment plant 312 flows to the sedimentation tank 814. In the sedimentation tank 314, the activated sludge with the treated water is separated in solid and liquid by sedimentation, and the supernatant of the treated water is released to public waters such as river through the treatment water pipe 376. A part of the sedimented activated sludge is sent through the sludge discharge pipe 378 as a excess sludge to a sludge treatment process, (not shown), and the remaining activated sludge is recycled to the anaerobic tank 364 through the sludge circular pipe 380.

Next, a description will be given of the operation of the sewage treatment system in the sixth embodiment according to this invention.

The sewage volume flowing into the raw water tank 320 through the raw water pipe 318 is detected by a flow meter 318 which is placed at the middle of the raw water pipe 318. When the influent sewage volume is more than a predetermined value, the additive valve 326 is opened to add the coagulant for a predetermined volume to the raw water tank 320 from the coagulant tank 322. That is, when the flow meter 328 detects the influent volume under the treatment capacity of the biological treatment plant 312, the flow meter 328 sends signals to the additive valve 326 to close, whereby the coagulant additive to sewage is stopped. When the flow meter 328 detects the influent volume exceeding the treatment capacity of the biological treatment plant 328, the flow meter 328 sends signals the additive valve 326 to open, whereby the coagulant to sewage is added. The sewage in the influent tank 320 is flown to the bottom of the filtration tank 338 in the high rate filtration plant 310 through the supply pipe 330 and the filtration pipe 334. At this time, the raw water valve 336 is kept open and the bypass valve 342 opens whenever necessary, as described before. The sewage supplied to the filtration tank 338 runs upward in the filtration tank 338, and the solid components in the sewage are filtered by the floating filters media layer 337. The filtered water filtered by the floating filter media layer 337 overflows into the trough 360, and reaches the aerobic tank 364 of the biological treatment tank 312 through the biological treatment pipe 362 and the distribution plant 366.

When the volume of the filtered water supplied to the biological treatment tank 312 exceeds the treatment capacity of the biological treatment plant 312, the distribution plant 366 distributes a part of the filtered water into the release pipe. In the biological treatment plant 312, the filtered water passes through the anaerobic tank 364, the denitrification tank 370 and the nitrification tank 372, so that the nitrogen components, the phosphorus components, and the organic components in the filtered water are removed by the biological treatment reaction. The water treated by the biological treatment plant 212 is sent to the sedimentation tank 314, and then the activated sludge is sedimented and separated in the sedimentation tank 314 to release into public waters such as river.

According to the sixth embodiment of the sewage treatment system in this invention, the high rate filtration plant 319 and the biological treatment plant 312 are coordinated to remove the solid components in the sewage by the high rate filtration plant 310 at high removal rate, so that the load placed on the biological treatment plant 312 is lessened. As the results, the quality of the treated water at the exit of the biological treatment plant 312 can be improved, and air to dissolve organic components in the biological treatment plant 212 can be saved to thereby save the aeration energy, and further, the excess sludge volume can be reduced. As carriers for wrapping nitrate bacteria is added in addition to the activated sludge to the nitrification tank 372 in the biological treatment plant 312, whereby the time for a nitrification reaction can be shortened.

As for the relation between the inflow volume and the treated water volume, the capacity of the biological treatment plant 312 is twice as much as the influent volume under dry weather (no water rising by rain). However, though a small precipitation per day is less than 50 mm, the raw water influent volume becomes to 2–3 times of the treatment capacity, and, when it becomes 50–100 mm, 3–5 times. In the combined sewage lines, when the influent sewage volume exceeds the treatment capacity of the biological treatment plant 312 by rising water level in wet weather, the excess sewage must be directly discharged into public waters such as river, after filtering by the high rate filtration plant 310. As increased sewage by rain in the combined sewage lines must be released into public waters after filtration only without biological treatment, solid components in sewage thus directly released must be removed as possible.

Figure 20:
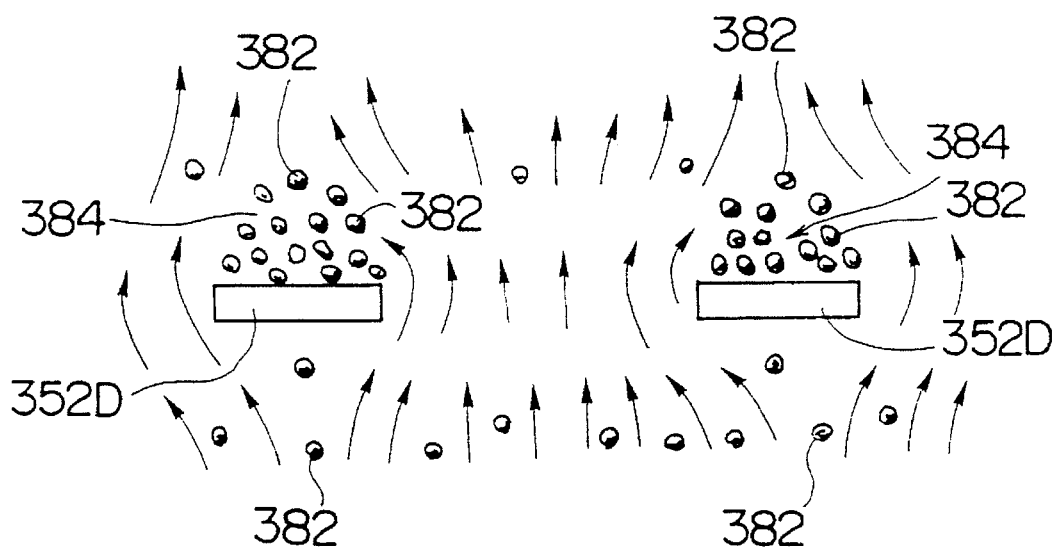
FIG. 20 is an explanatory view for explaining a catching mechanism of the solid components in the sewage without adding additives in the case that the filtration speed of the high speed filtration system is under 400 m/day in the sixth embodiment.
Figure 21:
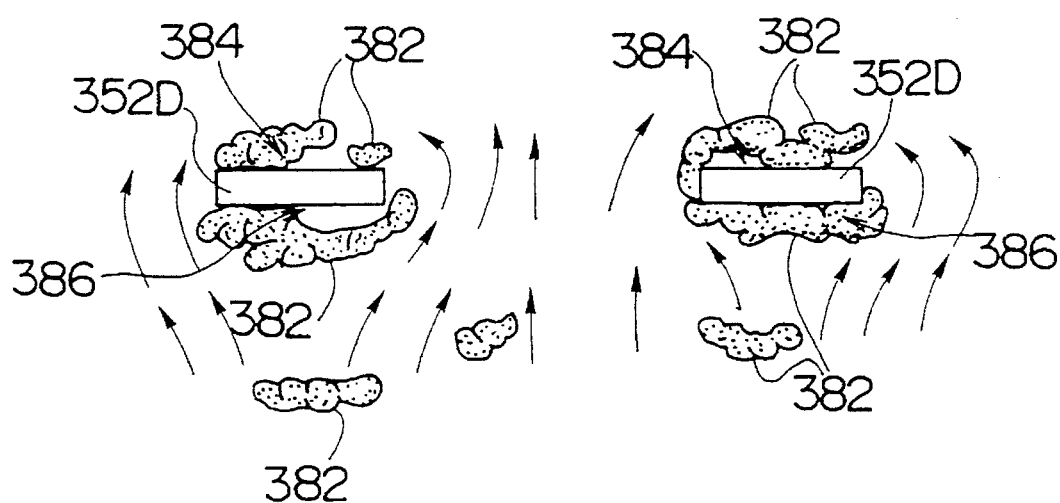
FIG. 21 is an explanatory view for explaining a catching mechanism of the solid components in the sewage with adding additives in the case that the filtration speed of the high speed filtration system is under 400 m/day in the sixth embodiment.
Figure 22:
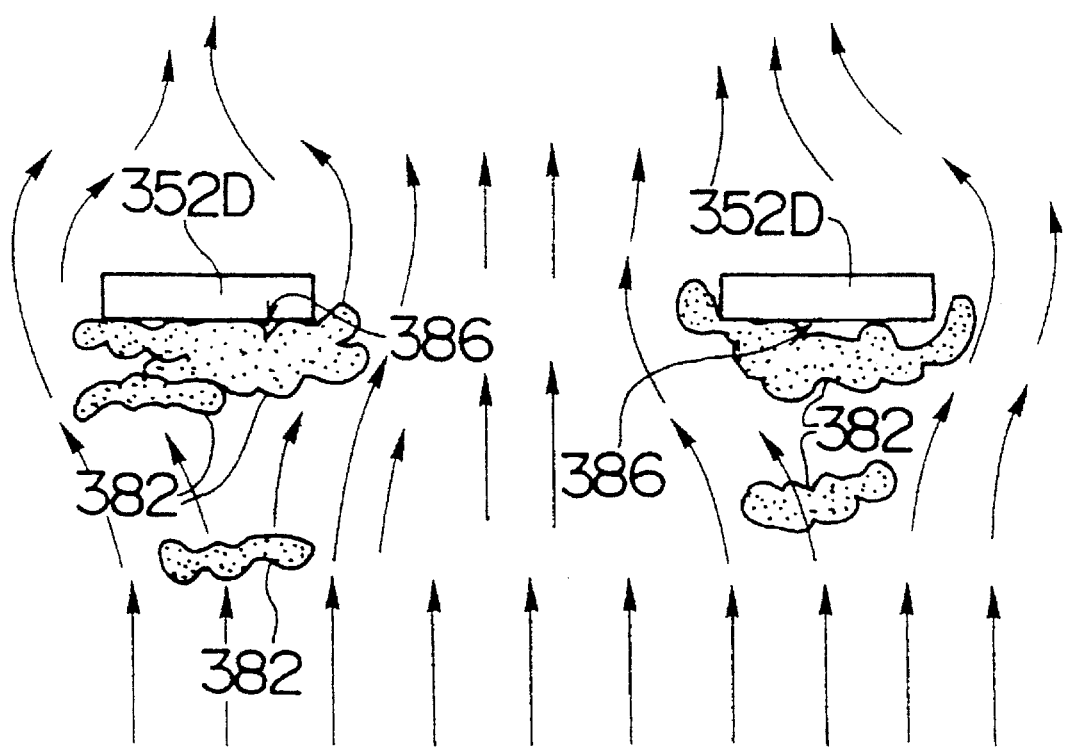
FIG. 22 is an explanatory view for explaining a catching mechanism of the solid components in the sewage with adding additives in the case that the filtration speed of the high speed filtration system is from 400 to 1000 m/day in the sixth embodiment; and, FIG. 23 is a constitutional view of the flow for explaining the seventh embodiment of sewage treatment system according to this invention.

The characteristics of the filter medium 352 structured as above mentioned (the structure has already been explained in the first embodiment in details) are explained with FIGS. 20, 21 and 22 in accordance by the relation with the filtration speed and the catching mechanism of the solid components in the sewage.

FIG. 20 illustrates the catching mechanism in which the filtration speed is lees than 400 m/day without adding coagulant. The solid components 382 without adding coagulant is small, and is sedimented on the filter media 352 and removed by the the catching mechanism which forms the sludge piling layer 384. That is, the contraction flow which flows through the mesh produces the speed difference, whereby circular flows occur.

The circular flow generates a local flow staying area on the upper part of the wire 352D which forms the mesh, and the solid components 382 in the sewage form the sludge pile layer 384 at the local flow staying area. As the local flow staying area spreads all over the floating filter media layer 337, solid components 382 are removed at high removal rates.

FIG. 21 illustrates the catching mechanism in which the filtration speed is lees than 400 m/day with adding coagulant. The solid components 382 added with coagulant flocculate and enlarge. As the low filtration rate is low, both the catching mechanism in which the solid components 382 settle and pile on the filter media 352 to form the sludge pile layer 384, and the caching mechanism in which the solid components 382 collide with the filter medium 352 to form the sludge adhering layer 386 are performed. As both the catching mechanism to forme the sludge pile layer 384 and the catching mechanism to form the sludge adhering layer 386 spread all over the floating filter layer layer 337, the removal rate of the solid components 382 gets even higher.

FIG. 22 illustrates the catching mechanism in which the filtration speed is 400–1000 m/day with adding coagulant. The solid components 382 added with coagulant flocculate and enlarge. As the high rate filtration is performed, the catching mechanism of the solid components 382 to form the sludge pile layer 384 on the upper surface of the filter media 352 dose not work, and only the catching mechanism to form sludge adhering layer 386 works. As the catching mechanism to form the sludge adhering layer 386 spreads all over the floating filter media layer 337, the solid components 382 can be removed at a high removal rate. The removal rates of the solid components 382 under the above three different filtration conditions are compared to show the best result with the case that the filtration speed is less than 400 m/day with coagulant added, followed by the case that the filtration rate is 400–1,000 m/day with coagulant added, and at last the case that the filtration rate is less than 400 m/day without adding coagulant.

The diameter of the wires 352 which forms the mesh screen of the filter media 352 is set within 1–5 mm, preferably 2–4 mm, whereby the sludge pile layer 384 can be formed easily, as well as the sludge adhering layer 388. In order to create a stable local staying flow area at the upper part of the wire 352D, which forms the mesh screen of the filter media 352, the diameter of the wire 352D is recommended more than 1 mm, preferably more than 2 mm. The wire 352D to form the sludge adhering layer 388 efficiently by the collision of the enlarged solid components 382 by coagulant additives should be somewhat thinner than solid components 382. As for the diameter of the enlarged solid components 382, 80% is 3–5 mm, and the remaining 20% is less than 3 mm. Therefore, to remove the solid components 382 with coagulant additives, the diameter of filter forming the wire 352 must be less than 5 mm, preferably less than 4 mm.

According this invention, by using the above mentioned characteristic of the filter medium 352, in the case the influent sewage volume is below the biological treatment capacity of the biological treatment plant 312, it is recommended that coagulant is not added to sewage, which is filtered by the high rate filtration plant 310 at the filtration rate less than 400 m/day, and the whole filtered water is sent to the biological treatment plant 812. In case influent sewage volume exceeds the biological treatment capacity of the biological treatment plant 312, the coagulant is added to the sewage, and filtered by the high rate filtration plant 310 at the filtration rate of 400–1,000 m/day, then, the disposable volume of the filtered water within the treatment capacity is sent to the biological treatment plant 312 through the distribution device 366, and the remaining volume is released into public waters such as river through the releasing pipe 368. Thus, the removal rate of the solid components in the sewage can be maintained at a high level, the optimal treatment condition matching the volume of local and seasonal daily rainfall, without expanding the sewage treatment plant, or maintaining the present plant site area, whereby a good quality standard can be obtained of both treated water after biological treatment by the biological treatment plant 312 and the water released from the high rate filtration plant 310 directly into public waters such as river.

The description will be given of the example of the treatment method using the sewage treatment system according to this invention compared with the conventional sewage treatment system consisting of the primary sedimentation tank and the activated sludge treatment system. In this example, the floating filter media layer 337's height is 2 m, and the vertical section is of 3 $m^2$ of the high rate filtration plant 310.

In case the influent sewage volume detected by the flow meter 328 is below the treatment capacity (1 Q) of the biological treatment plant 312, coagulant is not added to the raw water tank 320, the sewage is filtered at the filtration rate less than 400 m/day by the high rate filtration plant 310, and the whole volume of which is flown into the biological treatment plant 312, to apply the biological treatment. In this case, the filter medium 352 were washed twice a day.

As the results, the removal rate of the solid components at the high rate filtration plant 310 was about 60% as SS (suspended solid), and about 40 % as BOD. The quality of the filtered water at the exit of the high rate filtration plant 310 was 60 ppm as SS, and 80–90 ppm as BOD, 25 ppm as ammonium nitrogen, and 3 ppm as phosphorus concentration. The quality of water treated by the biological treatment plant 312, after filtration by the high rate filtration plant 310, was less than 5 ppm as SS, less than 5 ppm as BOD, less than 5 ppm as ammonium nitrogen, and less than 1 ppm as phosphorus concentration. Therefore, the filtration by the high rate filtration plant 310 lessens the load on the biological treatment plant 312, and the biological treatment can be performed very efficiently in the biological treatment plant 812.

Contrastingly, the removal rate of the solid components in the primary sedimentation tank of the conventional sewage treatment system is about 40% as SS, and about 30% as BOD.

And, the staying time of the sewage in the filtration tank 338 of the high rate filtration plant 810 at the filtration rate less than 400 m/day is about 1S minutes, however, the conventional primary sedimentation tank took 2 hours for the staying time. Therefore, this invention can shorten the filtration time to ⅛ by the conventional method, bad further the quality of the filtered water can be improved. This implies that the high rate filtration plant 310 saves the plant site area to ⅛ of the primary sedimentation tank.

The case will be explained connecting the influent volume detected by the flow meter 328 which has twice as much treatment capacity of the biological treatment tank 312 (2 Q). 1.0–2.0 mg/l of the cation type polymeric coagulant to the sewage in the raw water tank 320, the treatment in the high speed filtration plant 310 at the filtration speed 600 m/day, and flow the filtered water exceeding the treatment capacity of the biological treatment plant 312 to the releasing pipe 368 through the distributor 366 to release them directly into public waters. In this case, the filter medium 352 were washed three times a day.

In this case, the removal rate of the solid components 382 by the high rate filtration plant 310 was 85–90 % as SS, and about 60% as BOD. The quality of the filtered water at the exit of the high rate filtration plant 310 was 40–50 ppm as SS, 55–65 ppm as BOD, 25 ppm as ammonium nitrogen, and 3 ppm as phosphorus concentration. In this case, nitrogen concentration shortage occurs against the BOD concentration at the entrance of the biological treatment plant 312. Thus, a part of the sewage is supplied into the anaerobic tank 864 of the biological treatment plant 312 via the bypass pipe 340, by opening the bypass valve 342 for a predetermined value, whereby the BOD concentration is adjusted to 80–90 ppm.

The case will be explained connecting the influent volume detected by the flow meter 328 is three times as much the treatment capacity of the biological treatment tank 312 (3 Q). 1.0 to 2.0 mg/l of cation type polymeric coagulant which is added to the sewage in the raw water tank 320, the treatment in the high speed filtration plant 310 at the filtration speed 900 m/day, and flow the filtered water exceeding the treatment capacity of the biological treatment plant 312 to the releasing pipe 368 through the distributor 366 to release them directly into public waters. In this case, the filter medium 352 were washed six times a day.

In this case, the removal rate of the solid components 382 by the high rate filtration plant 310 was 80% as SS, and about 50% as BOD. The quality of the filtered water at the exit of the high rate filtration plant 310 was 45–55 ppm as SS, 60–75 ppm as BOD, 25 ppm as ammonium nitrogen, and 3 ppm as phosphorus concentration. The quality of the filtered water, which is treated biologically after filtration by the high speed filtration plant 310 was less than 5 ppm as SS, less than 5 ppm as BOD, less than 5 ppm as ammonium nitrogen, and less than 1 ppm as phosphorus concentration.

The amount of time the sewage stayed in the filtration tank 338 of the high rate filtration plant 310 at the filtration speed 900 m/day was about 6 minutes. Thus, amount time can be shortened to 1/20 of the the conventional amount time (2 hours), and the quality of the filtered water can be improved. In this case, the BOD concentration against nitrogen concentration at the entrance of the biological treatment plant 212 falls short. Therefore, the part of sewage is supplied to the anaerobic tank 864 of biological treatment plant 312 through the bypass pipe 340 by opening the bypass valve 342 for what is required, to adjust the BOD concentration to 80–90 ppm.

Thus, according to the sewage treatment system of this invention, the filtration condition in the high rate filtration system and the optimum treatment condition such as a released volume into public waters can be chosen so as to match the volume and quality of the influent sewage. In even the case that the influent sewage exceeds the treatment capacity of the biological treatment plant 312, the load on the biological treatment plant 312 is lessened to thereby maintain the efficient biological treatment and the water which is only filtered in the high filtration plant 310 can be released with a high quality into public waters such as rivers. The sewage treatment system according to this invention particularly suits to combined sewage lines. It suits not only when the influent sewage volume is within the treatment capacity of the biological treatment plant 312 in fine weather but also when the influent water volume exceeds the treatment capacity of the biological treatment plant 312 by the temporary increase of the influent water in wet weather. When the coagulant is added and the filtration speed is set less than 400 m/day, the solid components 382 can be removed by the catching mechanism for forming of the sludge pile layer 384 and the sludge adhering layer 386, whereby a very high removal rate can be obtained when adding coagulant to sewage, a part of the sewage is supplied to the entrance of the biological treatment plant 312 through the bypass pipe 340 to maintain the appropriate concentration of heterotrophy for microbes, whereby nutritive salts such as nitrogen components and phosphoric components are removed to prevent eutrophication.

Therefore, though the influent sewage volume exceeds the treatment capacity of the biological treatment plant 312, only the water is filtered by the high speed filtration system, a enough quality is obtained by adding appropriate coagulant and selecting appropriate filtration speed in the high rate filtration plant 310, whereby the part of the filtered water can be released into public waters bypassing the biological treatment plant 312 without degrading the public waters such as river.

The description will be given of the seventh embodiment of the sewage treatment system according this invention with FIG. 23.

The high rate filtration plants 310 are provided in parallel with two series (A and B), the high rate filtration plants 310A and 310B, is switched according to the influent sewage volume detected by the flow meter 328. As illustrated in FIG. 23, the sewage flows into the raw water sewage tank 320 from the raw water pipe 318 through flow meter 328, and from the raw water tank 320 to the sewage distributor 390. The sewage distributor 390 distributes the sewage to two high rate distribution plants 310A or 310B according to signals based on the influent sewage volume reported by flow meter 328. The distributor 366 of the B biological treatment pipe 362 may combine the filtered water of B to the A biological treatment pipe 362, or release them directly into public waters such as river through the releasing pipe 368. The supply of the sewage to the anaerobic tank 364 of the biological treatment plant 312 through the bypass pipe 340 is the same as the fifth embodiment.

As for the operation of the seventh embodiment will be explained.

(1) When the influent sewage volume is about half (½ Q) of the biological treatment plant's treatment capacity (1 Q), all sewage is flown into high rate filtration plant 310A of A, and treated at the filtration rate less than 400 m/day without adding coagulant, and all filtered water is sent to the biological treatment plant 312 for the biological treatment. At this time, the distributor 866 prevents the filtered water of A from flowing into B.

(2) When the influent sewage volume is about the same (1 Q) as the treatment capacity of the biological treatment plant 312, both the A and B high rate filtration plants 310A and 310B are used to filter at the filtration speed less than 400 m/day without adding coagulant, and all filtered water in the A and B plants are sent to the biological treatment plant 312 through the distributor 366 for the biological treatment.

(3) When the influent sewage amounts is about 1.5 (1.5 Q) of the treatment capacity of the biological treatment plant 312 and exceeds the treatment capacity, the distributor 366 cuts the linkage between the biological treatment pipes 362 of A and B, and sends the filtered water which is filtered in the A high rate filtration plant 310A into the biological treatment plant 312, while releases the filtered water by the B high rate filtration plant 310B directly into public waters through the releasing pipe 368. Then coagulant is added to the influent sewage in the raw water tank 320, and the waste water amount (1 Q) equivalent to the treatment capacity of the biological treatment tank 312 is flown to the A high rate filtration plant 310A to treat at the filtration speed less than 800 m/day, and then sent to the biological treatment plant 312. The remaining waste water (0.5 Q), which is added with coagulant in the raw water tank 320, flows into the B high rate filtration plant 310B through the sewage distributor 390, and treated at the filtration speed less than 400 m/day and released to public waters through the releasing pipe 368. By thus switching the high rate filtration plants 310A and 310B, the filtration condition of the high filtration system (B) is set such that the removal rate of the solid components in the sewage to be released is high, whereby the quality of the water to be released can be improved. In this case, the high removal rate of the solid components by the B high rate filtration plant 310B can be get as 95%.

(4) When the influent sewage volume about doubles (2 Q) the treatment capacity of the biological treatment plant 312, and exceeds the treatment capacity, the distributor 366 cuts off the linkage between the A and B of the biological treatment pipe 362, and the filtered water by the A high rate filtration plant 310A to the biological treatment plant 312 and the filtered water by the B high rate filtration plant 310B directly into public waters through the releasing pipe 368. Then the coagulant is added to the influent sewage in the raw water tank 320 and the waste water volume (1 Q) equivalent to the treatment capacity of the biological treatment plant 312 (1 Q) is sent by the sewage distributor 390 to the A high rate filtration plant 310A and treated at the filtration speed 800–1,000 m/day, and then sent to the biological treatment plant 312. The remaining sewage (1 Q), to which coagulant was added, is sent to the B high rate filtration plant 310B, and treated at the filtration speed 800–1,000 m/day, and then released to public waters through the releasing pipe 368.

Thus, according to the sixth embodiment of this invention, two high rate filtration plants 310 are provided, therefore, delicate filtration conditions can be set to deal with variable volume of influent sewage, to prevent degradation of waste water discharged into public waters such as river. Particularly, in high-rain area, the solid components in the sewage increase suddenly when rain starts, the above (3) operation is applied, whereby the filtration speed of the B high rate filtration plant 310B is lowered to raise the removal speed of the solid components 382. After some time from the rain start, the influent volume still increases but solid components 382 and BOD concentration fall drastically. In this case, though the operation is switched from (3) to (4), there is little decline of the quality of the released waste water as well as the natural environment is kept.

The method of washing the filter medium 352 in the sixth and seventh embodiments are the same as the first embodiment, so that no explanation is necessary herewith.

As described above, in the sewage treatment plant according to the first invention, the sewage which flows upward into the treatment tank is filtered by the floating filter media layer which is formed by the filter medium consisting of numerous meshy cylindrical filter medium with open upper and lower ends and meshy sides and having the void rate more than 80%. Therefore, the filtration capacity to filter the solid components in the sewage can be improved. The circular flow is generated in the sewage to scale the solid components adhering to the filter medium, and the sewage containing the solid components which is scaled by jetting the filter media layer as a whole are discharged from the tank. Therefore, the washing capacity can be improved. There is a partition which vertically separates the treatment tank at a predetermined width/height ratio of the floating filter media layer, and the air jetting means generate circular flows in each area of the treatment tank separated by the partition, whereby the solid components adhering to filter medium can be washed and scaled off within a short time and efficiently. The washing capacity can be improved significantly when the width/height ratio is 0.3–1.6, preferably 0.7–1.2, by placing the partition.

There is a guide passage to guide the circular flow vertically in each area. Therefore, only a little air can generate circular flow to save power to generate air, and running cost can be cut.

In the sewage treatment system according to first invention of this invention, even a large treatment tank using floating filter medium can afford to wash filters within a short time and efficiently, and solid/liquid separating system which saves power and low running cost can be provided.

The sewage treatment plant according to the second invention of this invention supplies the sewage from the storage tank to the filtration plant by water head difference caused by water level difference between the storage tank and the filtration plant, and generates circular flow in the filtration plant to filter through the floating filter medium. The filtration plant and the sedimentation plant are integrated into one unit, and the washing waste water are sent from the filtration plant to the sedimentation plant utilizing potential energy. With this arrangement, no power source to supply sewage to the filtration plant and to sent washing waste water from the filtration plant to the sedimentation plant is required, to save energy.

The filtration plant and the sedimentation plant are integrated vertically and an air jetting means is placed at the lower part of the floating filter media layer to blow air bubbles to scale the solid components adhering to the filter medium off and to send washing waste water containing scaled off solid contents to the sedimentation plant to sediment and separate them. Thus, the filter medium can be washed more easily, the washing waste water volume can be reduced and the system can become compact, compared to the conventional sewage treatment system in which filter medium are moved to the filter media recycling plant to be washed with fresh water and the fresh water flows downward opposite to the sewage.

The sewage treatment system according to the third invention of this invention is coordination of the high rate filtration plant with the biological treatment plant and removes the solid components in the waste water in the high rate filtration plant at a high speed, whereby the load of the biological treatment plant can be reduced. Therefore, the quality of the water after the biological treatment can be improved and the air volume for dissolving heterotrophy in the biological treatment plant can be reduced to thereby save aeration power, and further the generation volume of the excess sludge can be reduced. Further, carriers which wrap nitrification bacteria are added in the nitrification tank of the biological treatment plant, in addition to the activated sludge, the time for nitrification reaction can be saved.

The high rate filtration plant has made it possible to select the optimal condition depending upon the volume or the nature of the influent sewage such as filtration condition or the volume to be directly released into public waters, therefore, when the influent sewage exceeds the treatment capacity of the biological treatment plant, the load of the biological plant can be reduced and the effective biological treatment can be performed, and only the excess influent sewage is filtered by the high rate filtration plant, the high quality waste water can be released. Therefore, particularly in case of combined sewage lines, needless to say, in the case that the influent sewage is below the treatment capacity of the biological treatment system in fine weather, though the influent sewage exceeds temporarily the treatment capacity of the biological treatment plant in wet weather, the sewage can be treated.

In adding coagulant to the sewage, the part of the sewage is supplied into the biological treatment plant through the bypass pipe to maintain the predetermined meterotrophy concentration, and enough nutritious salts such as nitrogen components and phosphorus components are removed to prevent eutrophication.

The sewage treatment plant according to this invention has the advantage in that time for treating the influent sewage can be saved sufficiently and the quality of the filtered water can be improved, compared to the conventional sewage treatment system, which combines the primary sedimentation plant and the activated sludge treatment. As a result, the sewage treatment plant according to this invention considerably can expand the treatment capacity per plant site area compared to the conventional sewage treatment plant, and can become compact.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A sewage treatment system intended for filtering solid components in sewage and cleansing the sewage, the sewage treatment system comprising:

a floating filter media layer, which is provided in a treatment tank for filtering the solid components in the sewage which is upwardly flowed in the treatment tank by a layer which is formed with numerous floating filter medium which are meshy cylinders and have a smaller specific gravity than the sewage and in which both ends thereof are opened and a side thereof is meshy;

first air jetting means provided at a lower position of said floating filter media layer for jetting air upwardly from a horizontally-provided nozzle and from a central position of the treatment tank or a vicinity of a side wall of the treatment tank, and which produces a circular flow in the sewage in said treatment tank so as to exfoliate solid components adhering to said floating filter medium; and second air jetting means provided at a lower position of said floating filter media layer for jetting air to an entire bottom surface of the floating filter media layer so as to prevent the solid components in the sewage from adhering to the floating filter medium again when the sewage in the treatment tank, including the solid components exfoliated from said floating filter medium by said first air jetting means, is discharged from a bottom portion of the treatment tank.

2. A sewage treatment system as set forth in claim 1, wherein projections are provided inside of the floating filter medium.

3. A sewage treatment system as set forth in claim 1, wherein said meshy cylinders of said floating filter medium are made of wires, each wire having a diameter within 1 to 5 mm.

4. A sewage treatment system as set forth in claim 1, wherein a relationship between the treatment tank and the floating filter media layer is determined so that a width/height ratio of said floating filter media layer is from 0.3 to 1.6.

5. A sewage treatment system as set forth in claim 1, wherein a guide is arranged in a longitudinal direction in said treatment tank so as to form a guide passage which guides a flow of said circular flow.

6. A sewage treatment system as set forth in claim 1, wherein a partition is provided in a longitudinal direction in said treatment tank so that a relationship between the treatment tank and the floating filter media layer is set in such a manner that a width/height ratio of said floating filter media layer on each side of said partition is from 0.3 to 1.6; and said first air jetting means and said second air jetting means are provided in said each area.

7. A sewage treatment system as set forth in claim 6, wherein a guide is arranged in a longitudinal direction in each side of the partition in said treatment tank so as to form a guide passage which guides a flow of said circular flow.

8. A sewage treatment system for filtering solid components in sewage, and cleansing the sewage, the sewage treatment system comprising:

a filtration chamber, in which a floating filter media layer comprised of numerous floating filter medium which are meshy cylinders and have smaller specific gravity than the sewage for filtering an upward flow of inflow sewage, a first air jetting means fixed at a lower position of the floating filter media layer for generating a circular flow to the sewage in the treatment tank to wash the floating filter medium, and a second means for jetting air to the floating filter media layer to discharge the sewage which has washed the filter medium; and, a sedimentation chamber located under the filtration chamber through a partitive plate for storing the sewage which has washed the floating filter medium and has been jetted from the filtration chamber, said sewage therein being separated into sludge and supernatant liquid after sedimentation of the solid components in the sewage, wherein a filtration process in the filtration chamber and a sedimentation process in the sedimentation chamber are performed in parallel.

9. A sewage treatment system as set forth in claim 8, the sewage treatment system comprising:

a storage tank of the sewage, which is located near the filtration chamber and designed in a manner that a level of the storage tank becomes higher than a level of the filtration chamber;

a flocculating pipe which is near the filtration chamber;

a first connecting pipe for communicating the storage tank and an upper part of the flocculating pipe;

a second connecting pipe, which is installed in the sedimentation chamber, for connecting a lower part of the flocculating pipe and an opening formed in the partitive plate; and, a third connecting pipe for connecting a lower end of the flocculating pipe and the sedimentation chamber.

10. A sewage treatment system for filtering solid components in sewage, and cleansing the sewage, the sewage treatment system comprising:

a treatment tank;

a partition for separating an upper part of the treatment tank vertically into several areas;

a floating filter media layer, which is provided in each area, for filtering solid components in the sewage which is flowed in the treatment tank in an upward-flow with a layer of numerous floating filter medium, which have smaller specific gravity than the sewage;

a first air jetting means, which is located under the floating filter media layer, for generating a circular flow to the sewage in the treatment tank when the floating filter medium are washed and a second means for jetting air to the floating filter media layer as a whole to discharge the sewage, which has washed the floating filter medium, from the treatment tank; and, a scraping means, which is located at a bottom of the treatment tank, for scraping sedimented solid components in the sewage which has flowed into the treatment tank.

* * * * *